(12) United States Patent
Yamada et al.

(10) Patent No.: US 7,558,002 B2
(45) Date of Patent: Jul. 7, 2009

(54) PROJECTION ZOOM LENS AND PROJECTION-TYPE DISPLAY DEVICE

(75) Inventors: Hiroshi Yamada, Saitama (JP); Kimiaki Nakazawa, Saitama (JP)

(73) Assignee: Fujinon Corporation, Saitama-Shi (JP)

( * ) Notice: Subject to any disclaimer, the term of this patent is extended or adjusted under 35 U.S.C. 154(b) by 237 days.

(21) Appl. No.: 11/798,011

(22) Filed: May 9, 2007

(65) Prior Publication Data

US 2007/0263294 A1 Nov. 15, 2007

(30) Foreign Application Priority Data

May 10, 2006 (JP) .......................... P 2006-131938

(51) Int. Cl.
*G02B 15/14* (2006.01)
*G02B 3/00* (2006.01)
(52) U.S. Cl. ...................... 359/676; 359/649
(58) Field of Classification Search .................. 359/649, 359/676
See application file for complete search history.

(56) References Cited

U.S. PATENT DOCUMENTS 6,801,367 B2 * 10/2004 Nagahara ................... 359/680

FOREIGN PATENT DOCUMENTS

| JP | 2001-350096 A | 12/2001 |
|---|---|---|
| JP | 2003-337283 A | 11/2003 |
| JP | 2004-70306 A | 3/2004 |
| JP | 2005-62226 A | 3/2005 |

* cited by examiner

*Primary Examiner*—William C Choi
(74) *Attorney, Agent, or Firm*—Birch, Stewart, Kolasch & Birch, LLP

(57) ABSTRACT

A negative first group $G_1$ is fixed when a power of the projection zoom lens varies and has a focusing function. A positive second group $G_2$, a positive or negative third group $G_3$, a positive fourth group $G_4$ and a positive or negative group $G_5$ move with a mutual relationship. A sixth group $G_6$ functions as a relay lens. The fifth group $G_5$ includes a cemented lens formed by cementing a negative meniscus lens $L_{10}$ having a convex surface directed to the magnification side, a negative lens $L_{11}$ and a positive lens $L_{12}$ in order from a magnification side, and a positive lens $L_{13}$ having a convex surface directed to a reduction side. Also, an expression $|F5|/F>4.5$ is satisfied where F denotes a focal length of the projection zoom lens at a wide-angle end and F5 denotes a focal length of the fifth group.

8 Claims, 15 Drawing Sheets

EXAMPLE 1

EXAMPLE 1

WIDE

F/1.63
— G
--- R
-·- B
-0.001   0.001
SPHERICAL ABERRATION

ω=27.5°
— SAGITTAL
--- TANGENTIAL
-0.001   0.001
ASTIGMATISM

ω=27.5°
-2%   2%
DISTORTION

ω=27.5°
--- R
-·- B
-0.00005   0.00005
LATERAL CHROMATIC ABERRATION

TELE

F/2.12
— G
--- R
-·- B
-0.001   0.001
SPHERICAL ABERRATION

ω=21.7°
— SAGITTAL
--- TANGENTIAL
-0.001   0.001
ASTIGMATISM

ω=21.7°
-2%   2%
DISTORTION

ω=21.7°
--- R
-·- B
-0.00005   0.00005
LATERAL CHROMATIC ABERRATION

EXAMPLE 3

WIDE

SPHERICAL
ABERRATION

ASTIGMATISM

DISTORTION

LATERAL
CHROMATIC
ABERRATION

TELE

SPHERICAL
ABERRATION

ASTIGMATISM

DISTORTION

LATERAL
CHROMATIC
ABERRATION

EXAMPLE 5

WIDE

TELE

PROJECTION ZOOM LENS AND PROJECTION-TYPE DISPLAY DEVICE

BACKGROUND OF THE INVENTION

1. Technical Field

The invention relates to a projection zoom lens that is mounted on a projection-type display device and that includes six lens groups, four of which are movable, and a projection-type display device mounted with the projection zoom lens. More specifically, the invention relates to a projection zoom lens and a projection-type display device that enlarges and projects luminous fluxes, which carry video information from a light valve of an image display device, onto a screen.

2. Description of the Related Art

In recent years, a projector (projection-type display device) using a light valve such as a liquid crystal display device or a DMD display device has come into wide use. Accordingly, higher advancement is required for an optical system mounted on this projector.

For a projection lens of the above optical system, demanded is a wide angle of view and long back focus that allows an optical member, such as elements or prisms, to be inserted. Also, telecentricity on the reduction side is demanded depending on its usage. With diversification of markets, it is also demanded that the projection lens is made more compact. Moreover, it is demanded to improve the optical performance of the projection lens. From these viewpoints, attention has been paid to the configuration including six lens groups, in which two fixed lens groups are arranged in front of and in rear of four movable lens groups, respectively. For example, JP 2001-350096 A, JP 2003-337283 A, JP 2004-70306 and JP 2005-62226 disclose such a projection lens.

Meanwhile, with development of device technologies, resolution and chromatic aberration correction that meet higher fineness of devices are strongly required. For example, with higher density of pixels of a liquid crystal panel for use in a light valve, a requirement for the optical performance of a projection lens has also been increasingly severe. Specifically, one pixel of the liquid crystal panel is made fine to be about 10 μm, and design capable of substantially reducing various aberrations including chromatic aberration (particularly, lateral chromatic aberration) is demanded.

As liquid crystal panels are made fine, a bright (having a small F number) lens having large aperture is also required so that light that has passed through pixels can reach a screen without losing light intensity, if possible. In addition, in the case where transmissive liquid crystal panels are used as light valves, it is general to combine panels with microlenses together in order to improve illumination efficiency, and increasing the aperture size is very strongly required to the projection lens. Specifically, a bright lens having about 1.6 or less in F number is required.

However, any of the projection lenses disclosed in the above publications is not a projection zoom lens having optical performance capable of responding to pixels on a light valve, having about 10 μm in size.

In particular, since the projection lens disclosed in JP 2005-62226 A has 2.0 in F number and is thus dark, it is difficult to adopt such a projection lens when the transmissive liquid crystal panel is used as a light valve. Since the projection lenses disclosed in JP 2001-350096 A, JP 2003-337283 A and JP 2004-70306 A have a problem in terms of brightness due to its large F number, and besides have a large aberration, it is difficult to adopt any of those projection lenses in the case where liquid crystal to support high density of pixels is used.

SUMMARY OF THE INVENTION

The invention has been made in consideration of the above circumstances. The invention provides a bright projection zoom lens having about 1.6 in F number and capable of extremely favorably correcting various aberrations, particularly lateral color aberration, and sufficiently dealing with even the case where a transmissive liquid crystal panel is used as a light valve, and a projection display apparatus including the projection zoom lens.

According to an aspect of the invention, a projection zoom lens includes, in order from a magnification side, a first lens group, a second lens group, a third lens group, a fourth lens group, a fifth lens group and a sixth lens group. The first lens group performs focusing with being fixed when a power of the projection zoom lens varies. The first lens group has a negative refractive power. The second lens group has a positive refractive power. The third lens group has a positive or negative refractive power. The fourth lens group has a positive refractive power. The fifth lens group has a positive or negative refractive power. The sixth lens group is fixed when the power of the projection zoom lens varies. The sixth lens group has a positive refractive power. The second to fifth lens groups move with a mutual relationship to compensate continuously varying of the power of the projection zoom lens and movement of an image plane caused by the continuously varying of the power of the projection zoom lens. The fifth lens group includes a cemented lens formed by cementing a negative meniscus lens having a convex surface directed to the magnification side, a negative lens and a positive lens in order from the magnification side, and a positive lens having a convex surface directed to a reduction side. A telephoto end position of each of the second lens group, the fourth lens group and the fifth lens group is closer to the magnification side than a wide-angle end position of each of the second lens group, the fourth lens group and the fifth lens group.

The following conditional expression (1) may be satisfied:

$$|F5|/F > 4.5 \quad (1)$$

where F denotes a focal length of the projection zoom lens at a wide-angle end with a position of a conjugate point on the magnification side being at infinity, and F5 denotes a focal length of the fifth lens group.

Also, the following conditional expression (2) may be satisfied:

$$|F3|/F > 4.5 \quad (2)$$

where F denotes a focal length of the projection zoom lens at a wide-angle end with a position of a conjugate point on the magnification side being at infinity, and F3 denotes a focal length of the third lens group.

Also, the following conditional expression (3) may be satisfied:

$$2.0 < F4/F < 4.5 \quad (3)$$

where F denotes a focal length of the projection zoom lens at a wide-angle end with a position of a conjugate point on the magnification side being at infinity, and F4 denotes a focal length of the fourth lens group.

Also, the fourth lens group may include one positive lens.

Also, the second lens group may include at least two positive single lenses.

Also, the second lens group may include a cemented lens formed by cementing a negative lens and a positive lens, and another positive lens.

According to another aspect of the invention, a projection display device includes a light source, a light valve and any of the projection zoom lenses set forth above as a projection lens that projects onto a screen an optical image formed of light modulated by the light valve.

As described above, according to the above projection zoom lens and the projection display apparatus using the above projection zoom lens, the projection zoom lens including the six lens groups four of which are movable is configured so that the second lens group having the positive refractive power, the third lens group having the positive or negative refractive power, the fourth lens group having the positive refractive power, and the fifth lens group having the positive or negative refractive power are movable, and that these four lens groups move with the mutual relationship. Thereby, aberration fluctuation caused by zooming, particularly aberration fluctuation in a middle range of zooming can be reduced.

Also, the fifth lens group $G_5$ is a lens group from which first and second lenses are omitted as compared with a typical Gauss type lens. However, the four lens group $G_4$ is substituted for the first lens. Thereby, an air lens between third and fourth lenses exhibits exactly the same function as the Gauss type lens. Accordingly, coma aberration can be corrected appropriately.

In addition, in the zoom lens set forth above, the fifth lens group $G_5$ is configured so as to exhibit the same function as the typical Gauss type lens. In this regard, the conditional expression (1) is a conditional expression for securing effectiveness of this function. When the zoom lens satisfies this conditional expression (1), the same function as the Gauss type lens can be obtained surely, and thus coma aberration can be corrected favorably.

DETAILED DESCRIPTION OF THE INVENTION

Figure 1:
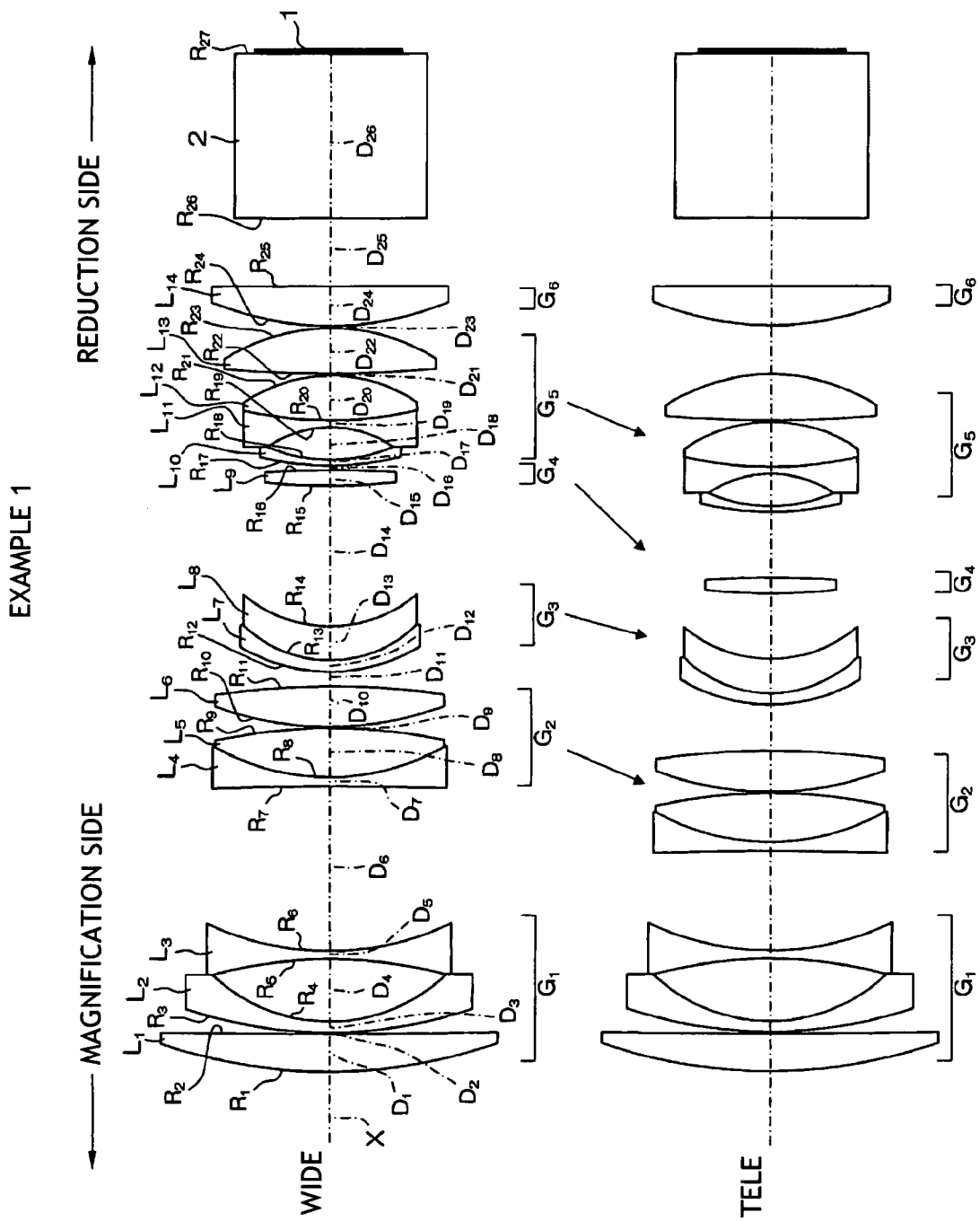
FIG. 1 is a view showing the lens configuration of a projection zoom lens according to Example 1 at its wide-angle end and at its telephoto end, respectively.

Hereinafter, embodiments of the invention will be described with reference to the accompanying drawings. FIG. 1 shows the basic configuration of a zoom lens according to Example 1 of the invention, and shows a lens configuration (W) at a wide-angle end and a lens configuration (T) at a telephoto end. This embodiment will be described with this lens taken as a representative example.

That is, this lens is configured so that arranged in order from a magnification side area first lens group $G_1$ that performs focusing with being fixed when a power of the projection zoom lens varies and that has a negative refractive power, a second lens group $G_2$ having a positive refractive power, a third lens group $G_3$ having a positive or negative refractive power, a fourth lens group $G_4$ having a positive refractive power, a fifth lens group $G_5$ having a positive or negative refractive power, and a sixth lens group $G_6$ that is fixed when the power of the zoom lens varies and that has a positive refractive power. The second to fifth lens groups $G_2$ to $G_5$ move with a mutual relationship to compensate continuously varying of the power of the projection zoom lens and movement of an image plane caused by the continuously varying of the power of the projection zoom lens. In addition, the third lens group $G_3$ and the fifth lens group $G_5$ are lenses mainly having an aberration correction function, and are set so as to have a relatively weak power.

Also, as shown in the drawing, the first lens group $G_1$ is constituted by three lenses $L_1$ to $L_3$, the second lens group $G_2$ is constituted by three lenses $L_4$ to $L_6$ (two lenses in Example 6), the third lens group $G_3$ is constituted by two lenses $L_7$ to $L_8$ (a single lens in Example 4), the fourth lens group $G_4$ is constituted by one lens $L_9$, the fifth lens group $G_5$ is constituted by four lenses $L_{10}$ to $L_{13}$, and the sixth lens group $G_6$ is constituted by one lens $L_{14}$.

Here, the fifth lens group $G_5$ is constituted by a cemented lens formed by cementing a negative meniscus lens $L_{10}$ ($L_9$ in Examples 4 and 6) having a convex surface directed to the magnification side, a negative lens $L_{11}$ ($L_{10}$ in Examples 4 and 6), and a positive lens $L_{12}$ ($L_{13}$ in Examples 4 and 6) in order from the magnification side; and a positive lens $L_{13}$ ($L_{14}$ in Examples 4 and 6) having a convex surface directed to the reduction side.

The fifth lens group $G_5$ has a configuration similar to a Gauss type lens. That is, a typical Gauss type lens is constituted by six lenses, i.e., a convex lens, a convex lens, a concave lens, a concave lens, a convex lens and a convex lens, and is symmetrical with respect to a plane. In this Gauss type lens, the second and third lenses, and the fourth and fifth lenses are cemented lenses, respectively. Since first and second lenses are omitted from the fifth lens group $G_5$ of this embodiment, the fifth lens group $G_5$ is not a typical Gauss type lens. However, an air lens between third and fourth lenses exhibits exactly the same function as the Gauss type lens. Accordingly, coma aberration can be corrected appropriately.

Also, the fourth lens group $G_4$ is constituted by one positive lens, is configured so as to function as an alternative to the first lens of the Gauss type lens, and is configured so as to favorably exhibit the same function as the Gauss type lens, similarly to the configuration of the fifth lens group $G_5$.

Meanwhile, in the zoom lens of this embodiment, a lens equivalent to the second lens (the positive lens constituting the cemented lens) of the Gauss type lens is not provided. This is based on the following reason. That is, a pupil in design is disposed on the magnification side of the fourth lens group $G_4$, and an image of a light source is formed in that position. Thus, if there is an optical component to move to the vicinity of the pupil in response to movement of the lens groups when the power of the zoom lens varies, the heat-resistance of the component should be taken into consideration.

Also, a telephoto end zooming position of each of the second lens group $G_2$, the fourth lens group $G_4$ and the fifth lens group $G_5$ is closer to the magnification side than a wide-angle end zooming position of each of the second lens group $G_2$, the fourth lens group $G_4$ and the fifth lens group $G_5$. In the example shown in FIG. 1, a telephoto end zooming position of the third lens group $G_3$ is also closer to the magnification side than its wide-angle end zooming position. However, the telephoto end zooming position of the third group lens $G_3$ may be closer to the reduction side than its wide-angle end zooming position.

Also, the second lens group $G_2$ may be constructed by a cemented lens formed by cementing the negative lens $L_4$ and the positive lens $L_5$, and the positive lens $L_6$ (corresponding to Examples 1 to 5, and 7.

That is, in order to secure sufficient zooming magnification, the power of the second lens group $G_2$ is required. However, if the power is too strong, it becomes difficult to correct lateral color aberration and comma aberration. Therefore, it is desirable to adopt such a configuration that a cemented lens is included in the second lens group $G_2$, as shown in FIG. 1.

Moreover, the second lens group $G_2$ may include at least two positive single lenses $L_4$ and $L_5$ (corresponding to Example 6). In this case, in order to make the lateral color aberration smaller, it is desirable to adopt such a configuration that a cemented lens is included in the third lens group $G_3$.

In addition, the sixth lens group $G_6$ is a relay lens that is fixed when the power of the zoom lens varies. A color synthesizing prism 2 is arranged between this sixth lens group $G_6$ and a liquid crystal display panel 1. Also, the symbol "X" in the drawings represents an optical axis.

Moreover, it is desirable that the projection zoom lens is configured so as to satisfy the following conditional expressions (1) to (3).

$$|F5|/F > 4.5 \quad (1)$$

$$|F3|/F > 4.5 \quad (2)$$

$$2.0 < F4/F < 4.5 \quad (3)$$

where

F denotes a focal length of the whole lens system at a wide-angle end (a position of a conjugate point on the magnification side is at infinity), $F_3$ denotes a focal length of the third lens group $G_3$, $F_4$ denotes a focal length of the fourth lens group $G_4$ and $F_5$ denotes a focal length of the fifth lens group $G_5$.

Figure 15:
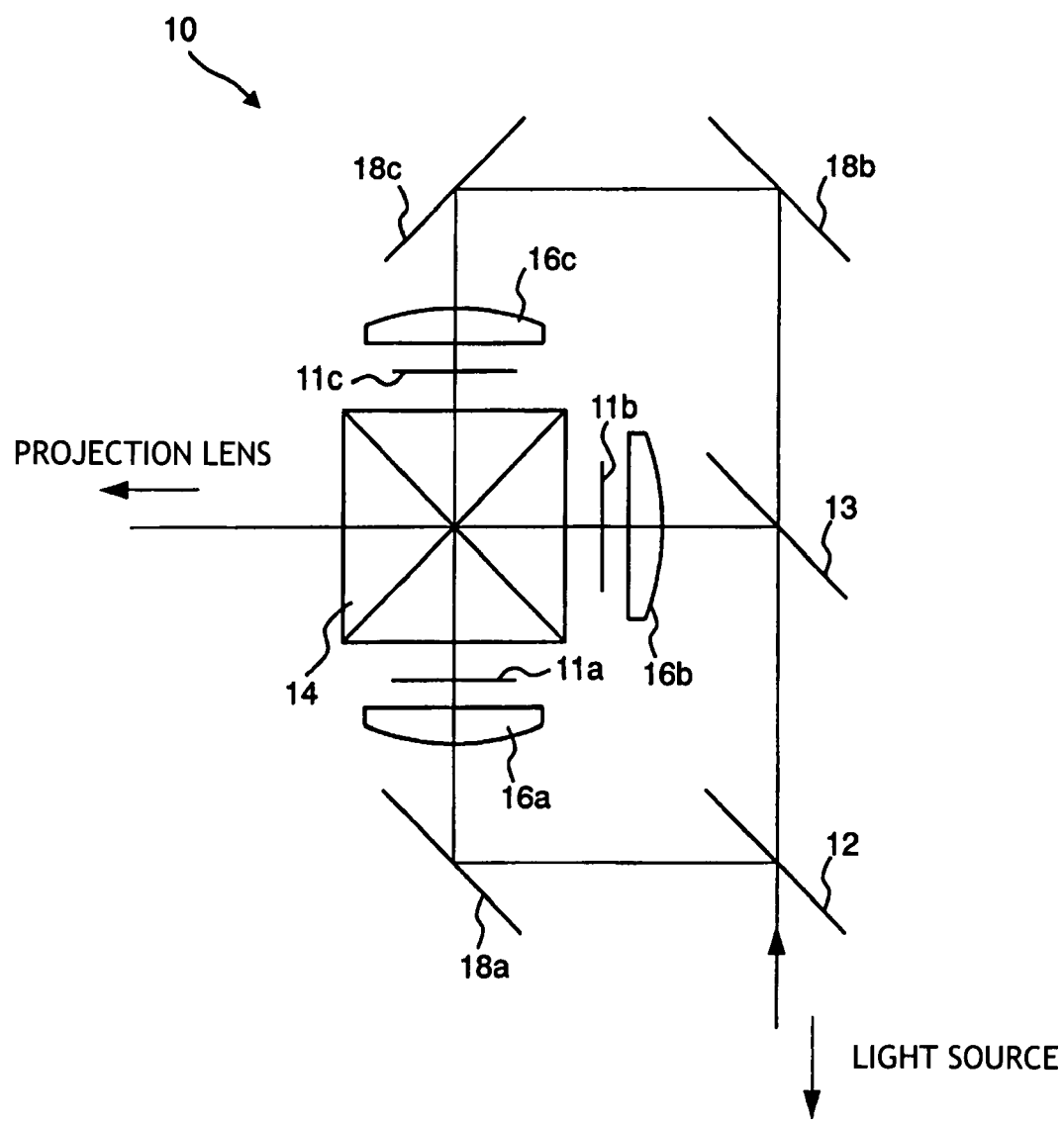
FIG. 15 is a schematic view showing a portion of a projection-type display device according to this embodiment.

Also, the projection-type display device according includes a light source, a light valve, and the zoom lens according to the above-mentioned embodiment. In this device, the projection zoom lens according to this embodiment functions as a projection lens for projecting onto a screen an optical image formed by light modulated by the light valve. For example, as shown in FIG. 15, this device includes an illumination optical system 10 having transmissive liquid crystal panels 11a to 11c as light valves, dichroic mirrors 12 and 13 for color separation, a cross dichroic prism 14 for color synthesis, condenser lenses 16a to 16c, and total reflection mirrors 18a to 18c. Although illustration of a front stage of the dichroic mirror 12 is omitted, the white light from a light source enters the liquid crystal panels 11a to 11c corresponding to three color luminous fluxes (green (G) light, blue (B) light, and red (R) light) and is modulated therein, and is then projected onto a screen (not shown) by the projection zoom lens (projection lens) according to the above-mentioned embodiment.

As described above, in this embodiment, in order to compensate continuously varying of the power of the projection zoom lens and movement of an image plane caused by the continuously varying of the power of the projection zoom lens, four groups including the second lens group $G_2$ having the positive refractive power, the third lens group $G_3$ having the positive or negative refractive power, the fourth lens group $G_4$ having the positive refractive power, and the fifth lens group $G_5$ having the positive or negative refractive power move with the mutual relationship. As a result, aberration fluctuation caused by zooming, particularly aberration fluctuation in a middle range of zooming can be reduced.

Next, technical definitions of the individual conditional expressions (1) to (3) will now be described.

As described above, the fifth lens group $G_5$ is configured similarly to the Gauss type lens so that coma aberration can be corrected well. Thus, the above conditional expression (1), which is a conditional expression for securing effectiveness of the above function, defines a range for making the power of the fifth lens group $G_5$ relatively weak. If $|F5|/F$ falls below the lower limit, the power of the fifth lens group $G_5$ becomes too strong, and thus it becomes difficult to correct coma aberration.

Also, the above conditional expression (2) is a conditional expression for defining the power of the third lens group $G_3$. That is, it is desirable for the third lens group $G_3$ to optimize the height of the rays of light entering the fourth lens group $G_4$ and the fifth lens group $G_5$, and further to have such a power that sufficient back focus is satisfied. If the negative power of the third lens group $G_3$ becomes too strong and thus $|F3|/F$ falls below the lower limit, the rays of light entering the fifth lens group $G_5$ becomes high, and consequently it becomes difficult to correct spherical aberration and coma aberration. On the other hand, if the positive power of the third lens group $G_3$ becomes too strong and thus $|F3|/F$ falls below the lower limit, it is difficult to secure sufficient back focus.

The above conditional expression (3) is an expression that defines a range for making the positive power of the fourth lens group $G_4$ appropriate. That is, if F4/F falls below the lower limit of the conditional expression (3), the positive power of the fourth lens group $G_4$ becomes too strong, and particularly when the fourth lens group $G_4$ is constituted by a single lens, it becomes difficult to correct spherical aberration and coma aberration. On the other hand, if F4/F exceeds the upper limit of the conditional expression (3), the amount of generated aberration can be reduced but the traveling distance of the lens during the varying of the power of the zoom lens becomes too large. Consequently, the total length of the lens increases too much.

In addition, in the zoom lens of this embodiment, the fourth lens group $G_4$ is constituted by one single lens. Alternatively, the fourth lens group $G_4$ may be constituted by a cemented lens having the same power. However, as mentioned above, the fourth lens group $G_4$ is arranged in the vicinity of the pupil. Therefore, in the case where the fourth lens group $G_4$ is constituted by the cemented lens, there is a difficulty in heat resistance.

In addition, as the projection zoom lens of the invention, various modifications can be made. For example, the number of lenses constituting each lens group, the radius of curvature of each lens, and the interval of lenses (or lens thickness) can be modified appropriately.

Also, although the lens of the invention is particularly effective when being used as a projection lens of a projection-type display device using transmissive liquid crystal display panels, the invention is not limited to such application. For example, the lens of the invention can be used not only as a projection lens of an device using reflective liquid crystal panels, a projection lens using other light-modulating means, such as DMD, or the like, but also as an imaging lens having a zooming function used for cameras using an imaging means such as a CCD and an image pickup tube or a silver salt film and the like.

Hereinafter, individual examples will be specifically described with reference to data.

EXAMPLE 1

The projection zoom lens according to Example 1 is configured as shown in FIG. 1 as mentioned above. That is, in this lens, the first lens group $G_1$ is constituted, in order from the magnification side, by the first lens $L_1$ including a positive meniscus lens having a convex surface directed to the magnification side; the second lens $L_2$ including a negative meniscus lens having a convex surface directed to the magnification side; and the third lens $L_3$ including a biconvex lens. The second lens group $G_2$ is constituted by a cemented lens formed by cementing the fourth lens $L_4$ having a biconcave lens and a fifth lens $L_5$ having a biconcave lens; and a sixth lens $L_6$ including a biconvex lens. The third lens group $G_3$ is constituted by a cemented lens formed by cementing a seventh lens $L_7$ including a negative meniscus lens having a convex surface directed to the magnification side; and an eighth lens $L_8$ including a positive meniscus lens having a convex surface directed to the magnification side.

Also, the fourth lens group $G_4$ is constituted by a ninth lens $L_9$ including a biconvex lens. The fifth lens group $G_5$ is constituted by a tenth lens $L_{10}$ including a negative meniscus lens having a convex surface directed to the magnification side; a cemented lens obtained by cementing an eleventh lens $L_{11}$ including a biconcave lens and a twelfth lens $L_{12}$ including a biconvex lens; and a thirteenth lens $L_{13}$ including a biconvex lens having a surface, which has a strong curvature, directed to the reduction side. The sixth lens group $G_6$ is constituted by a fourteenth lens $L_{14}$ including a plane-convex lens having a convex surface directed to the magnification side.

Table 1 shows the radius of curvature R (a focal length in a state where the position of a conjugate point on the magnification side at the wide-angle end is in infinity is normalized as 1; this applies to each of the following tables) of each lens surface, the center thickness of each lens, the air gap D between adjacent lenses (normalized by the same focal length as in the above-mentioned radius of curvature R; this applied to each of the following tables), and the refractive index N and Abbe number ν of each lens with respect to d-line in Example 1. In Table 1 and its subsequent Tables 3, 5, 7, 9, 11, and 13, numbers corresponding to the references "R," "D," "N," and "ν" increase sequentially from the magnification side.

Also, the upper part of Table 1 shows the focal length f, F number, and viewing angle 2ω of the whole system in Example 1.

Moreover, the lower part of Table 1 shows a distance $D_6$ (variable 1) between the first lens group $G_1$ and the second lens group $G_2$, a distance $D_{11}$ (variable 2) between the second lens group $G_2$ and the third lens group $G_3$, a distance $D_{14}$ (variable 3) between the third lens group $G_3$ and the fourth lens group $G_4$, a distance $D_{16}$ (variable 4) between the fourth lens group $G_4$ and the fifth lens group $G_5$ and a distance $D_{23}$ (variable 5) between the fifth lens group $G_5$ and the sixth lens group $G_6$ at each of the wide-angle end (zoom ratio: 1.00) and the telephoto end (zoom ratio: 1.30).

TABLE 1

Focal Length f = 1.00~1.30
Fno. = 1.63~2.12
Angle of View 2ω = 55.0~43.4 degrees

| Surface Number | R | D | $N_d$ | $ν_d$ |
|---|---|---|---|---|
| 1 | 3.405 | 0.245 | 1.77250 | 49.6 |
| 2 | 63.893 | 0.010 | | |
| 3 | 2.965 | 0.069 | 1.69680 | 55.5 |
| 4 | 1.123 | 0.401 | | |
| 5 | −3.025 | 0.054 | 1.61800 | 63.4 |
| 6 | 1.864 | Variable 1 | | |
| 7 | −26.423 | 0.058 | 1.84666 | 23.8 |
| 8 | 1.545 | 0.315 | 1.64769 | 33.8 |
| 9 | −3.658 | 0.007 | | |
| 10 | 2.144 | 0.264 | 1.80400 | 46.6 |
| 11 | −5.420 | Variable 2 | | |
| 12 | 1.158 | 0.073 | 1.62041 | 60.3 |
| 13 | 0.827 | 0.220 | 1.83400 | 37.2 |
| 14 | 0.892 | Variable 3 | | |
| 15 | 4.077 | 0.102 | 1.72916 | 54.7 |
| 16 | −6.952 | Variable 4 | | |
| 17 | 1.959 | 0.037 | 1.51742 | 52.4 |
| 18 | 1.064 | 0.208 | | |
| 19 | −0.744 | 0.046 | 1.75520 | 27.5 |
| 20 | 2.547 | 0.289 | 1.43875 | 95.0 |
| 21 | −1.031 | 0.010 | | |
| 22 | 7.815 | 0.297 | 1.61800 | 63.4 |
| 23 | −1.312 | Variable 5 | | |
| 24 | 2.043 | 0.254 | 1.83481 | 42.7 |
| 25 | ∞ | 0.434 | | |
| 26 | ∞ | 1.058 | 1.51633 | 64.1 |
| 27 | ∞ | | | |

| | Variable 1 | Variable 2 | Variable 3 | Variable 4 | Variable 5 |
|---|---|---|---|---|---|
| Zoom Ratio 1.00 | 1.062 | 0.095 | 0.902 | 0.031 | 0.015 |
| Zoom Ratio 1.30 | 0.641 | 0.299 | 0.425 | 0.421 | 0.319 |

Also, Table 2 shows back focus BF and values corresponding to the individual conditional expressions (1) to (3) in Example 1.

TABLE 2

| |F3|/F | 27.437 |
|---|---|
| F4/F | 3.538 |
| |F5|/F | 55.803 |
| BF | 1.132 |

Figure 2:
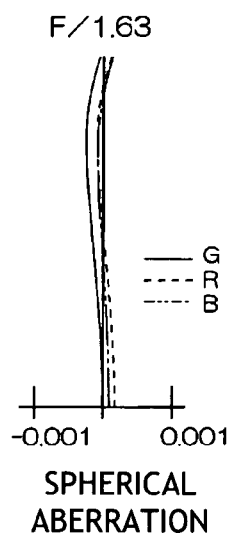
FIG. 2 is an aberration chart showing the lens configuration of the projection zoom lens according to Example 1.
Figure 2:
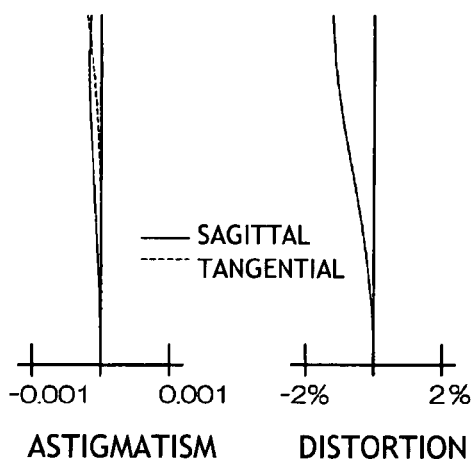
Figure 2:
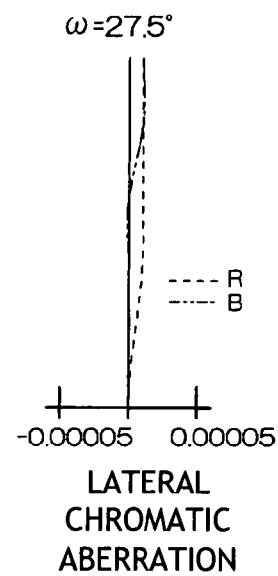
Figure 2:
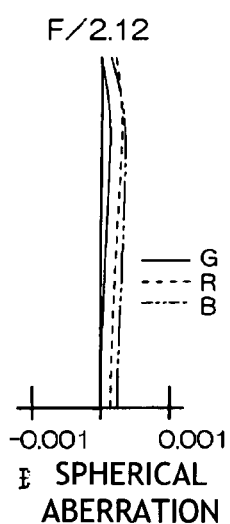
Figure 2:
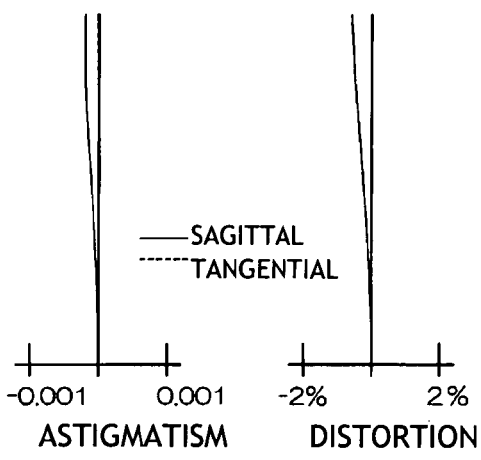
Figure 2:
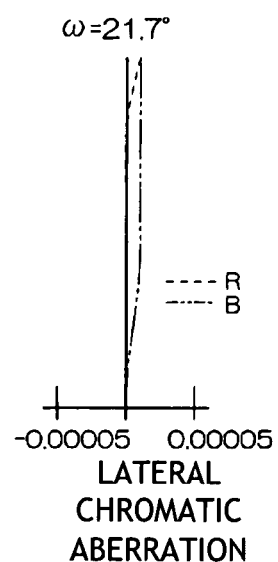

Also, FIG. 2 is an aberration chart showing various aberrations (spherical aberration, astigmatism, distortion, and lateral color aberration) at the wide-angle end (wide) of the projection zoom lens according to Example 1 and at the telephoto end (tele) of the projection zoom lens according to Example 1. In each of the spherical aberration charts of FIGS. 2, 4, 6, 8, 10, 12 and 14, G (green) indicates an aberration curve with respect to e-line (546.1 nm), B (blue) indicates an aberration curve with respect to a wavelength of 460 nm, and R (red) indicates an aberration curve with respect to a wavelength of 620 nm. Also, in each of the astigmatism charts of the above drawings, aberrations with respect to the sagittal image surface and the tangential image surface are shown. Moreover, in each of the lateral color aberration charts of the above drawings, aberrations of R and B with respect to G are shown.

As apparent from FIG. 2 and Tables 1 and 2, according to the projection zoom lens of Example 1, aberrations can be favorably corrected over the whole zoom range, an appropriate amount of back focus and a substantial telecentricity on the reduction side can be achieved, and individual performances, such as brightness, compactness, wideness of the viewing angle, and the zoom ratio, can be exhibited with the best balance. In particular, the brightness and the lateral color aberration can be made extremely favorable.

EXAMPLE 2

Figure 3:
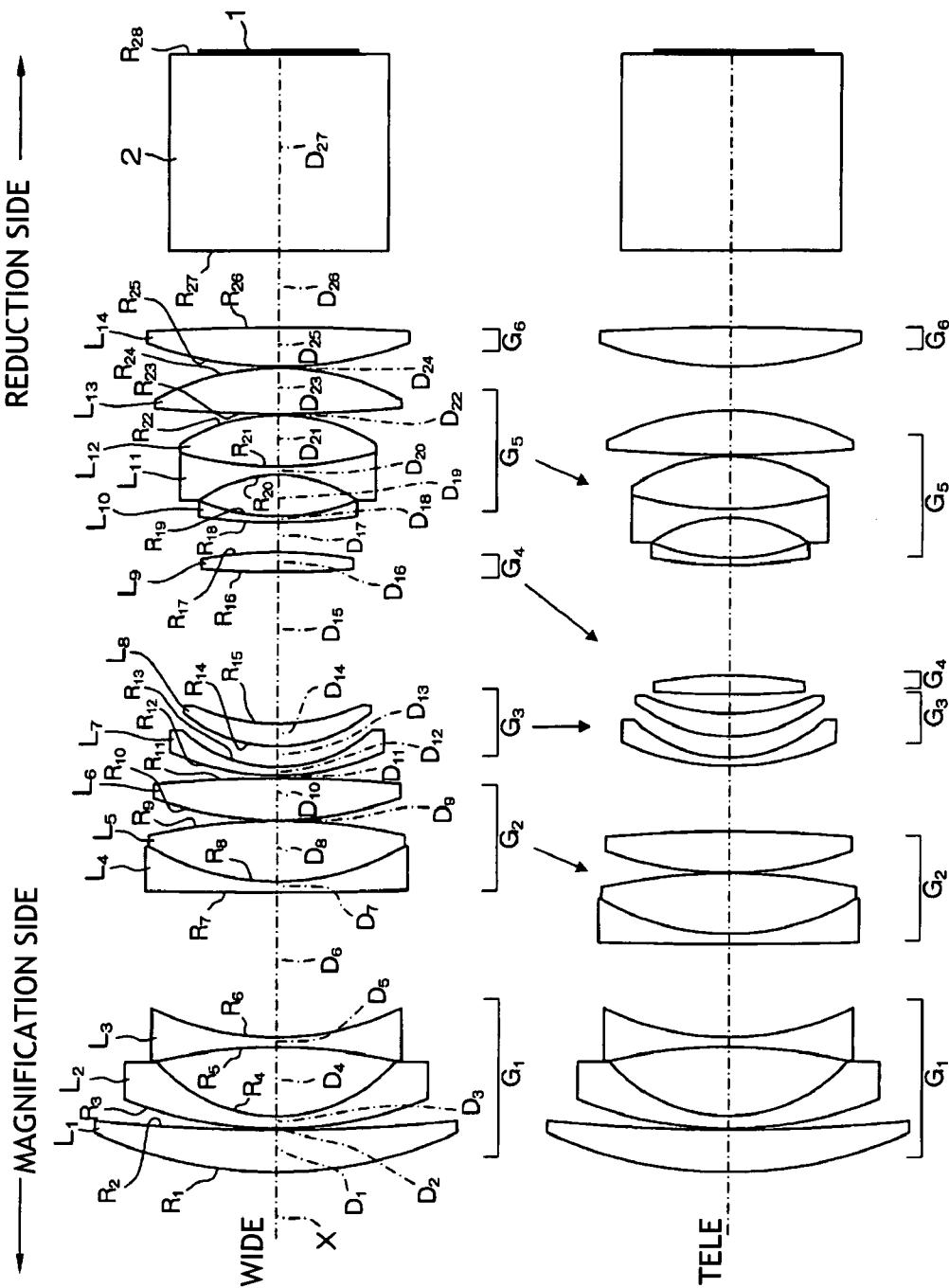
FIG. 3 is a view showing the lens configuration of a projection zoom lens according to Example 2 at its wide-angle end and at its telephoto end, respectively.

A projection zoom lens according to Example 2 has the lens configuration as shown in FIG. 3. This projection zoom lens basically has almost the same configuration as that of Example 1. However, this projection zoom lens is different from that of Example 1 in that the lens ($L_4$) of the second lens group $G_2$ on the most magnification side is constituted by a negative meniscus lens having a convex surface directed to the magnification side, that two lenses ($L_7$, $L_8$) constituting the second lens group $G_2$ are made independent from each other, and that the sixth lens group $G_6$ is constituted by a biconcave lens ($L_{14}$) having a surface, which has a strong curvature, directed to the magnification side.

Table 3 shows the radius of curvature R of each lens surface, the center thickness of each lens, the air gap D between adjacent lenses, and the refractive index N and Abbe number ν of each lens with respect to d-line in Example 2.

Also, the upper part of Table 3 shows the focal length f, F number, and viewing angle 2ω of the whole system in Example 2.

Moreover, the lower part of Table 3 shows the distance $D_6$ (variable 1) between the first lens group $G_1$ and the second lens group $G_2$, the distance $D_{11}$ (variable 2) between the second lens group $G_2$ and the third lens group $G_3$, the distance $D_{15}$ (variable 3) between the third lens group $G_3$ and the fourth lens group $G_4$, the distance $D_{17}$ (variable 4) between the fourth lens group $G_4$ and the fifth lens group $G_5$, and the distance $D_{24}$ (variable 5) between the fifth lens group $G_5$ and the sixth lens group $G_6$, at each of the wide-angle end (zoom ratio: 1.00) and the telephoto end (zoom ratio: 1.33).

TABLE 3

Focal Length f = 1.00~1.33
Fno. = 1.63~2.08
Angle of View 2ω = 62.0~48.0 degrees

| Surface Number | R | D | $N_d$ | $v_d$ |
|---|---|---|---|---|
| 1 | 3.015 | 0.287 | 1.78590 | 44.2 |
| 2 | 12.342 | 0.010 | | |
| 3 | 2.787 | 0.086 | 1.69680 | 55.5 |
| 4 | 1.100 | 0.463 | | |
| 5 | −3.781 | 0.066 | 1.83400 | 37.2 |
| 6 | 1.946 | Variable 1 | | |
| 7 | 33.756 | 0.071 | 1.84666 | 23.8 |
| 8 | 1.738 | 0.409 | 1.83400 | 37.2 |
| 9 | −4.009 | 0.004 | | |
| 10 | 2.542 | 0.279 | 1.83400 | 37.2 |
| 11 | −10.074 | Variable 2 | | |
| 12 | 1.752 | 0.057 | 1.71300 | 53.9 |
| 13 | 0.980 | 0.142 | | |
| 14 | 1.046 | 0.150 | 1.68893 | 31.1 |

TABLE 3-continued

Focal Length f = 1.00~1.33
Fno. = 1.63~2.08
Angle of View 2ω = 62.0~48.0 degrees

| 15 | 1.446 | Variable 3 | | |
|---|---|---|---|---|
| 16 | 7.208 | 0.130 | 1.48749 | 70.2 |
| 17 | −2.959 | Variable 4 | | |
| 18 | 3.410 | 0.046 | 1.51742 | 52.4 |
| 19 | 1.464 | 0.273 | | |
| 20 | −0.961 | 0.056 | 1.78472 | 25.7 |
| 21 | 2.494 | 0.351 | 1.49700 | 81.6 |
| 22 | −1.240 | 0.010 | | |
| 23 | 9.216 | 0.306 | 1.69680 | 55.5 |
| 24 | −1.798 | Variable 5 | | |
| 25 | 2.586 | 0.270 | 1.78590 | 44.2 |
| 26 | −15.044 | 0.513 | | |
| 27 | ∞ | 1.321 | 1.51633 | 64.1 |
| 28 | ∞ | | | |

| | Variable 1 | Variable 2 | Variable 3 | Variable 4 | Variable 5 |
|---|---|---|---|---|---|
| Zoom Ratio 1.00 | 0.987 | 0.020 | 1.026 | 0.199 | 0.008 |
| Zoom Ratio 1.33 | 0.631 | 0.439 | 0.131 | 0.747 | 0.294 |

Also, Table 4 shows back focus BF and values corresponding to the individual conditional expressions (1) to (3) in Example 2.

TABLE 4

| |F3|/F | 9.300 |
|---|---|
| F4/F | 4.321 |
| |F5|/F | 30.280 |
| BF | 1.384 |

Figure 4:
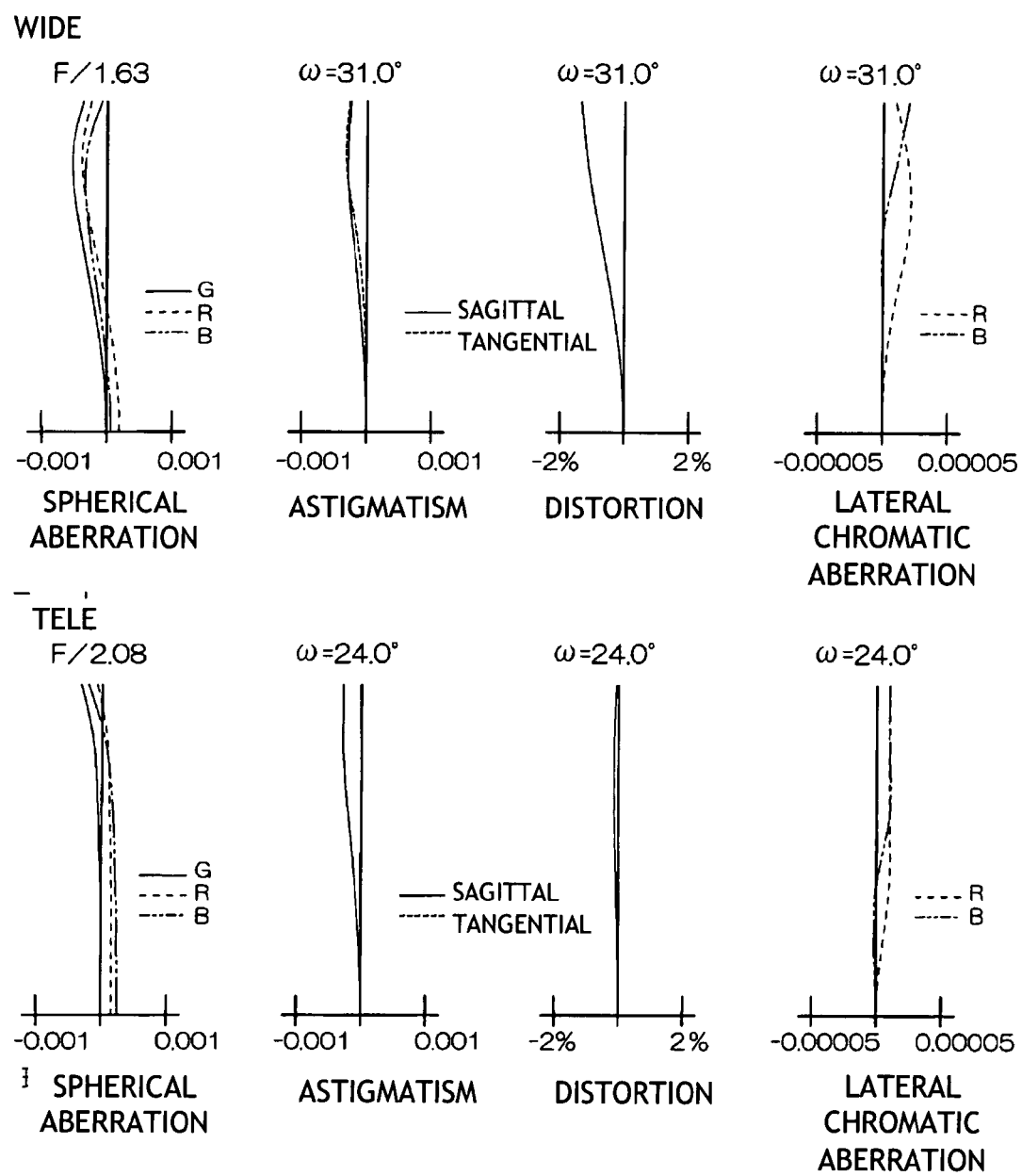
FIG. 4 is an aberration chart showing the lens configuration of the projection zoom lens according to Example 2.

Also, FIG. 4 is an aberration chart showing various aberrations (spherical aberration, astigmatism, distortion, and lateral color aberration) at the wide-angle end (wide) of the projection zoom lens according to Example 2 and at the telephoto end (tele) of the projection zoom lens according to Example 2.

As apparent from FIG. 4 and Tables 3 and 4, according to the projection zoom lens of Example 2, aberrations can be favorably corrected over the whole zoom range, an appropriate amount of back focus and a substantial telecentricity on the reduction side can be achieved, and individual performances, such as brightness, compactness, wideness of the viewing angle, and the zoom ratio, can be exhibited with the best balance. In particular, the brightness and lateral color aberrations can be made extremely favorable.

EXAMPLE 3

Figure 5:
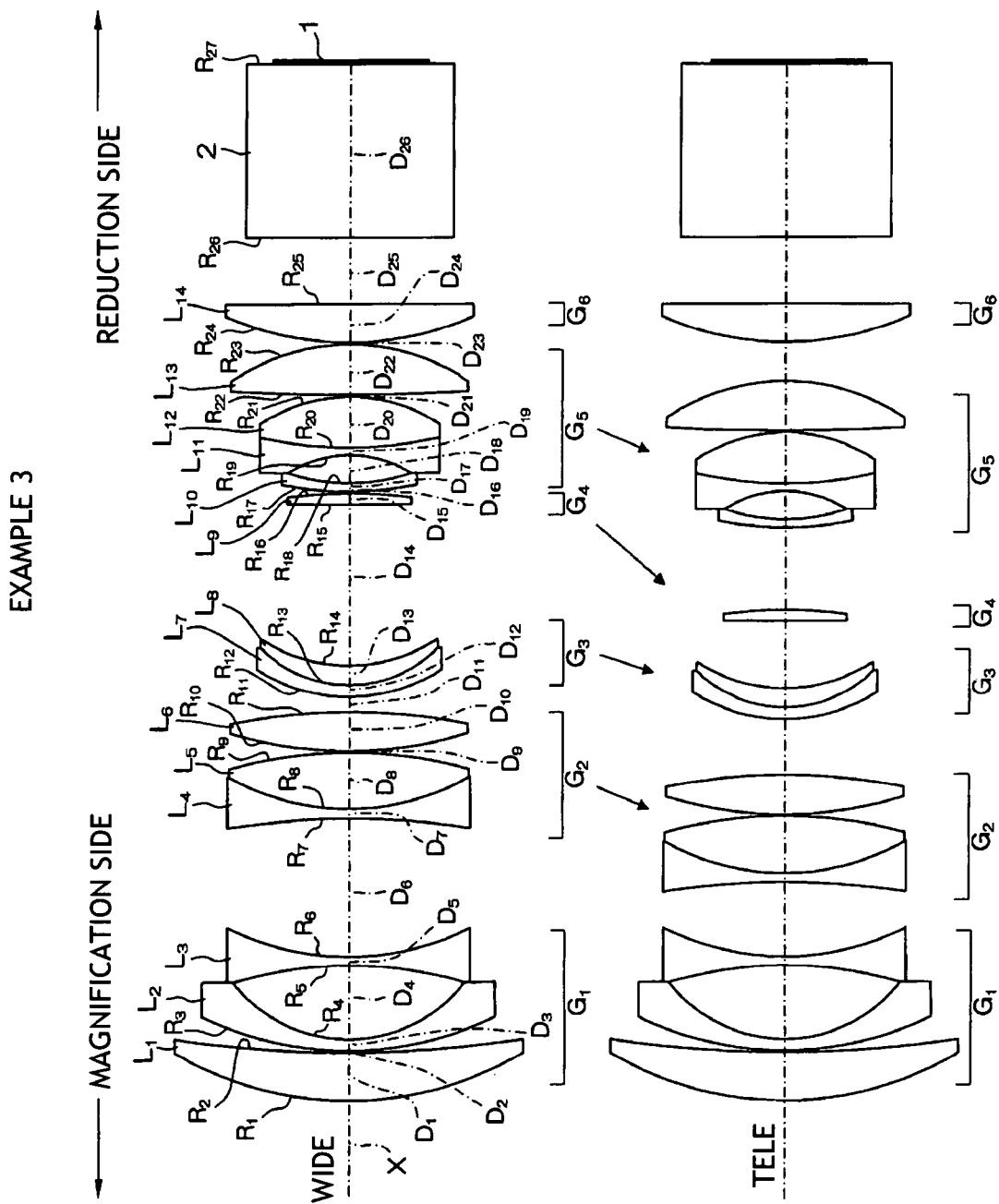
FIG. 5 is a view showing the lens configuration of a projection zoom lens according to Example 3 at its wide-angle end and at its telephoto end, respectively.

A projection zoom lens according to Example 3 has a lens configuration as shown in FIG. 5. This projection zoom lens has almost the same configuration as that of Example 1.

Table 5 shows the radius of curvature R of each lens surface, the center thickness of each lens, the air gap D between adjacent lenses, and the refractive index N and Abbe number ν of each lens with respect to d-line in Example 3.

Also, the upper part of Table 5 shows the focal length f, F number, and viewing angle 2ω of the whole system in Example 3.

Moreover, the lower part of Table 5 shows the distance $D_6$ (variable 1) between the first lens group $G_1$ and the second lens group $G_2$, the distance $D_{11}$ (variable 2) between the second lens group $G_2$ and the third lens group $G_3$, the distance $D_{14}$ (variable 3) between the third lens group $G_3$ and the fourth lens group $G_4$, the distance $D_{16}$ (variable 4) between the fourth lens group $G_4$ and the fifth lens group $G_5$, and the distance $D_{23}$ (variable 5) between the fifth lens group $G_5$ and the sixth lens group $G_6$, at each of the wide-angle end (zoom ratio: 1.00) and the telephoto end (zoom ratio: 1.30).

TABLE 5

Focal Length f = 1.00~1.30
Fno. = 1.63~2.27
Angle of View 2ω = 54.6~42.8 degrees

| Surface Number | R | D | $N_d$ | $v_d$ |
|---|---|---|---|---|
| 1 | 2.135 | 0.296 | 1.77250 | 49.6 |
| 2 | 7.386 | 0.010 | | |
| 3 | 2.109 | 0.069 | 1.69680 | 55.5 |
| 4 | 0.923 | 0.449 | | |
| 5 | -2.510 | 0.053 | 1.62041 | 63.4 |
| 6 | 1.688 | Variable 1 | | |
| 7 | -4.843 | 0.057 | 1.84666 | 23.8 |
| 8 | 1.538 | 0.344 | 1.74950 | 33.8 |
| 9 | -2.805 | 0.007 | | |
| 10 | 2.541 | 0.239 | 1.83481 | 46.6 |
| 11 | -3.774 | Variable 2 | | |
| 12 | 1.059 | 0.072 | 1.69680 | 60.3 |
| 13 | 0.772 | 0.121 | 1.68893 | 37.2 |
| 14 | 1.003 | Variable 3 | | |
| 15 | 44.014 | 0.067 | 1.69680 | 54.7 |
| 16 | -3.015 | Variable 4 | | |
| 17 | 2.167 | 0.049 | 1.51742 | 52.4 |
| 18 | 1.202 | 0.172 | | |
| 19 | -0.728 | 0.046 | 1.80518 | 27.5 |
| 20 | 2.442 | 0.313 | 1.43875 | 95.0 |
| 21 | -1.014 | 0.010 | | |
| 22 | 13.127 | 0.304 | 1.69680 | 63.4 |
| 23 | -1.332 | Variable 5 | | |
| 24 | 1.946 | 0.232 | 1.83400 | 42.7 |
| 25 | ∞ | 0.404 | | |
| 26 | ∞ | 1.050 | 1.51633 | 64.1 |
| 27 | ∞ | | | |

| | Variable 1 | Variable 2 | Variable 3 | Variable 4 | Variable 5 |
|---|---|---|---|---|---|
| Zoom Ratio 1.00 | 0.842 | 0.094 | 0.980 | 0.010 | 0.012 |
| Zoom Ratio 1.30 | 0.455 | 0.338 | 0.410 | 0.501 | 0.234 |

Also, Table 6 shows back focus BF and numerical values corresponding to the individual conditional expressions (1) to (3) in Example 3.

TABLE 6

| |F3|/F | 82.090 |
|---|---|
| F4/F | 4.051 |
| |F5|/F | 142.359 |
| BF | 1.096 |

Figure 6:
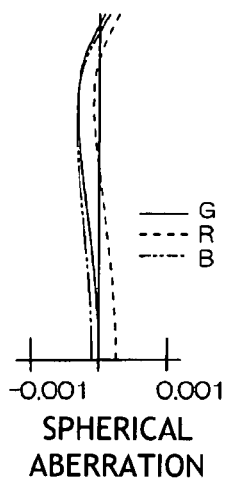
FIG. 6 is an aberration chart showing the lens configuration of the projection zoom lens according to Example 3.
Figure 6:
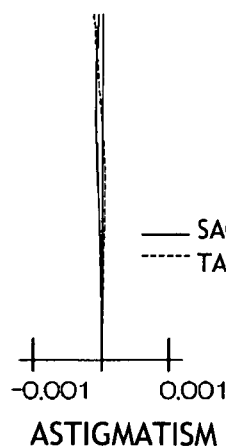
Figure 6:
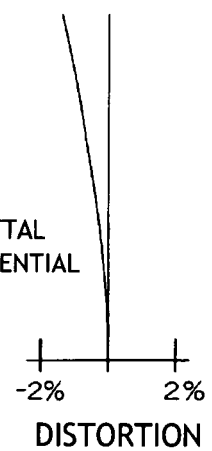
Figure 6:
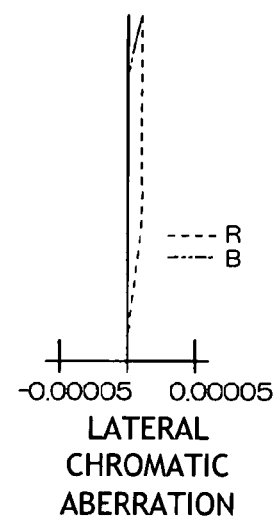
Figure 6:
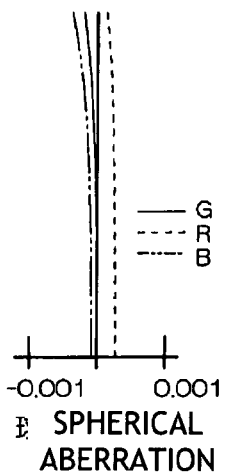
Figure 6:
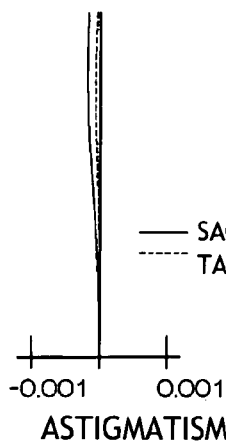
Figure 6:
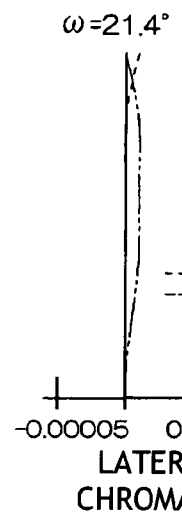

Also, FIG. 6 is an aberration chart showing various aberrations (spherical aberration, astigmatism, distortion, and lateral color aberration) at the wide-angle end (wide) of the projection zoom lens according to Example 3 and at the telephoto end (tele) of the projection zoom lens according to Example 3.

As apparent from FIG. 6 and Tables 5 and 6, according to the projection zoom lens of Example 3, aberrations can be favorably corrected over the whole zoom range, an appropriate amount of back focus and a substantial telecentricity on the reduction side can be achieved, and individual performances, such as brightness, compactness, wideness of the viewing angle, and the zoom ratio, can be exhibited with the best balance. In particular, the brightness and lateral color aberrations can be made extremely favorable.

EXAMPLE 4

Figure 7:
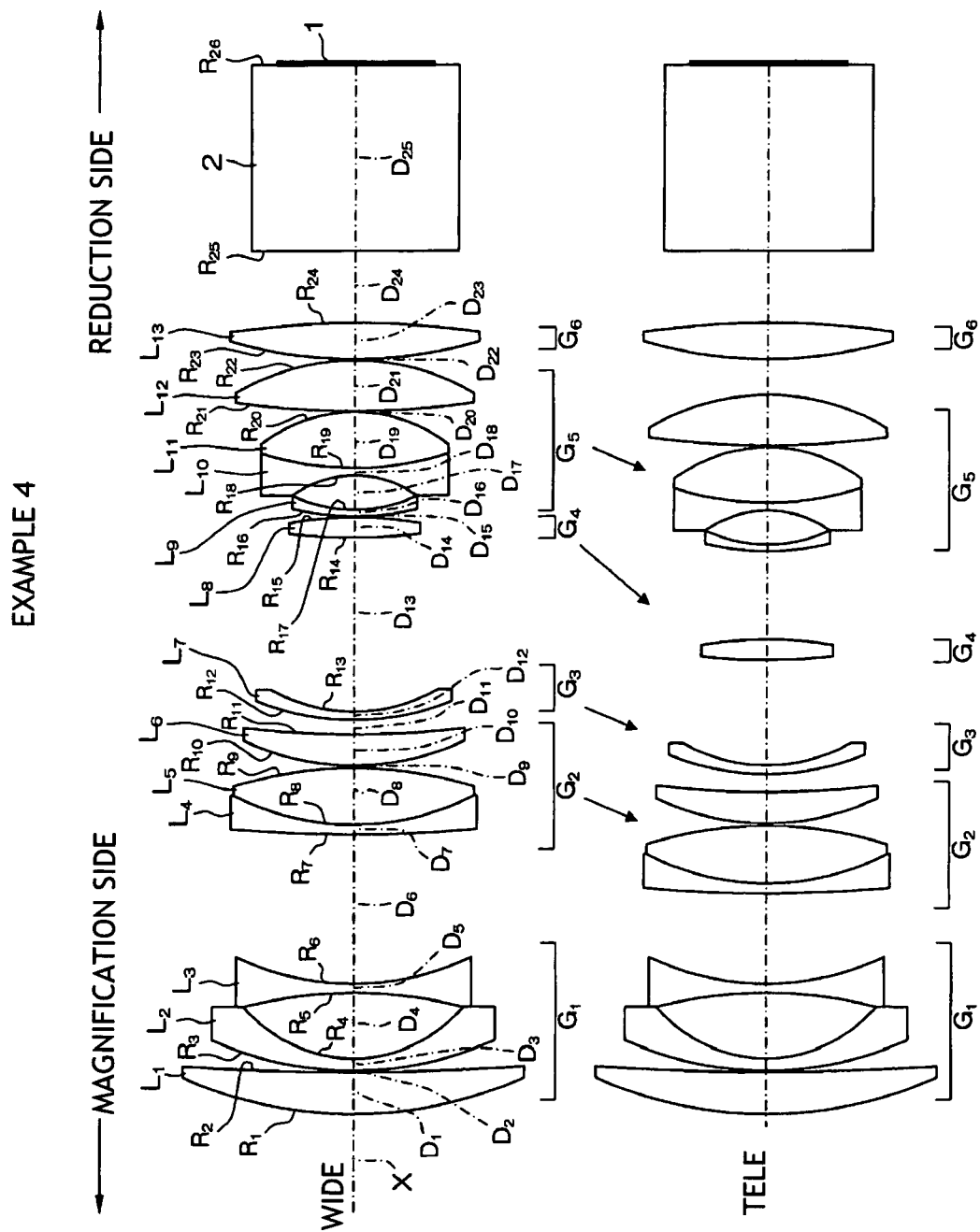
FIG. 7 is a view showing the lens configuration of a projection zoom lens according to Example 4 at its wide-angle end and at its telephoto end, respectively.

A projection zoom lens according to Example 4 has a lens configuration as shown in FIG. 7. This projection zoom lens basically has almost the same configuration as that of Example 2. However, this projection zoom lens is different from that of Example 2 in that the third lens group $G_3$ is constituted by only a meniscus lens ($L_7$) having a convex surface directed to the magnification side.

Table 7 shows the radius of curvature R of each lens surface, the center thickness of each lens, the air gap D between adjacent lenses, and the refractive index N and Abbe number v of each lens with respect to d-line in Example 4.

Also, the upper part of Table 7 shows the focal length f, F number, and viewing angle 2ω of the whole system in Example 4.

Moreover, the lower part of Table 7 shows the distance $D_6$ (variable 1) between the first lens group $G_1$ and the second lens group $G_2$, the distance $D_{11}$ (variable 2) between the second lens group $G_2$ and the third lens group $G_3$, the distance $D_{13}$ (variable 3) between the third lens group $G_3$ and the fourth lens group $G_4$, the distance $D_{15}$ (variable 4) between the fourth lens group $G_4$ and the fifth lens group $G_5$, and the distance $D_{22}$ (variable 5) between the fifth lens group $G_5$ and the sixth lens group $G_6$, at each of the wide-angle end (zoom ratio: 1.00) and the telephoto end (zoom ratio: 1.33).

TABLE 7

Focal Length f = 1.00~1.33
Fno. = 1.63~2.28
Angle of View 2ω = 62.0~48.2 degrees

| Surface Number | R | D | $N_d$ | $v_d$ |
|---|---|---|---|---|
| 1 | 3.117 | 0.297 | 1.71300 | 53.9 |
| 2 | 18.423 | 0.010 | | |
| 3 | 2.578 | 0.086 | 1.69680 | 55.5 |
| 4 | 1.060 | 0.471 | | |
| 5 | -3.294 | 0.066 | 1.83400 | 37.2 |
| 6 | 2.038 | Variable 1 | | |
| 7 | 9.910 | 0.071 | 1.84666 | 23.8 |
| 8 | 1.943 | 0.409 | 1.83400 | 37.2 |
| 9 | -3.001 | 0.017 | | |
| 10 | 1.887 | 0.225 | 1.83400 | 37.2 |
| 11 | 7.059 | Variable 2 | | |
| 12 | 1.900 | 0.063 | 1.48749 | 70.2 |
| 13 | 1.247 | Variable 3 | | |
| 14 | 4.219 | 0.144 | 1.48749 | 70.2 |
| 15 | -2.966 | Variable 4 | | |
| 16 | 1.975 | 0.046 | 1.51823 | 59.0 |
| 17 | 1.074 | 0.243 | | |
| 18 | -0.804 | 0.056 | 1.72825 | 28.5 |
| 19 | 2.310 | 0.394 | 1.49700 | 81.6 |
| 20 | -1.147 | 0.010 | | |
| 21 | 6.411 | 0.363 | 1.62041 | 60.3 |
| 22 | -1.713 | Variable 5 | | |
| 23 | 3.322 | 0.258 | 1.71300 | 53.9 |
| 24 | -6.523 | 0.513 | | |
| 25 | ∞ | 1.321 | 1.51633 | 64.1 |
| 26 | ∞ | | | |

| | Variable 1 | Variable 2 | Variable 3 | Variable 4 | Variable 5 |
|---|---|---|---|---|---|
| Zoom Ratio 1.00 | 1.063 | 0.103 | 1.241 | 0.008 | 0.008 |
| Zoom Ratio 1.33 | 0.645 | 0.131 | 0.753 | 0.637 | 0.258 |

Also, Table 8 shows back focus BF and numerical values corresponding to the individual conditional expressions (1) to (3) in Example 4.

TABLE 8

| |F3|/F | 7.683 |
|---|---|
| F4/F | 3.596 |
| |F5|/F | 25.814 |
| BF | 1.385 |

Figure 8:
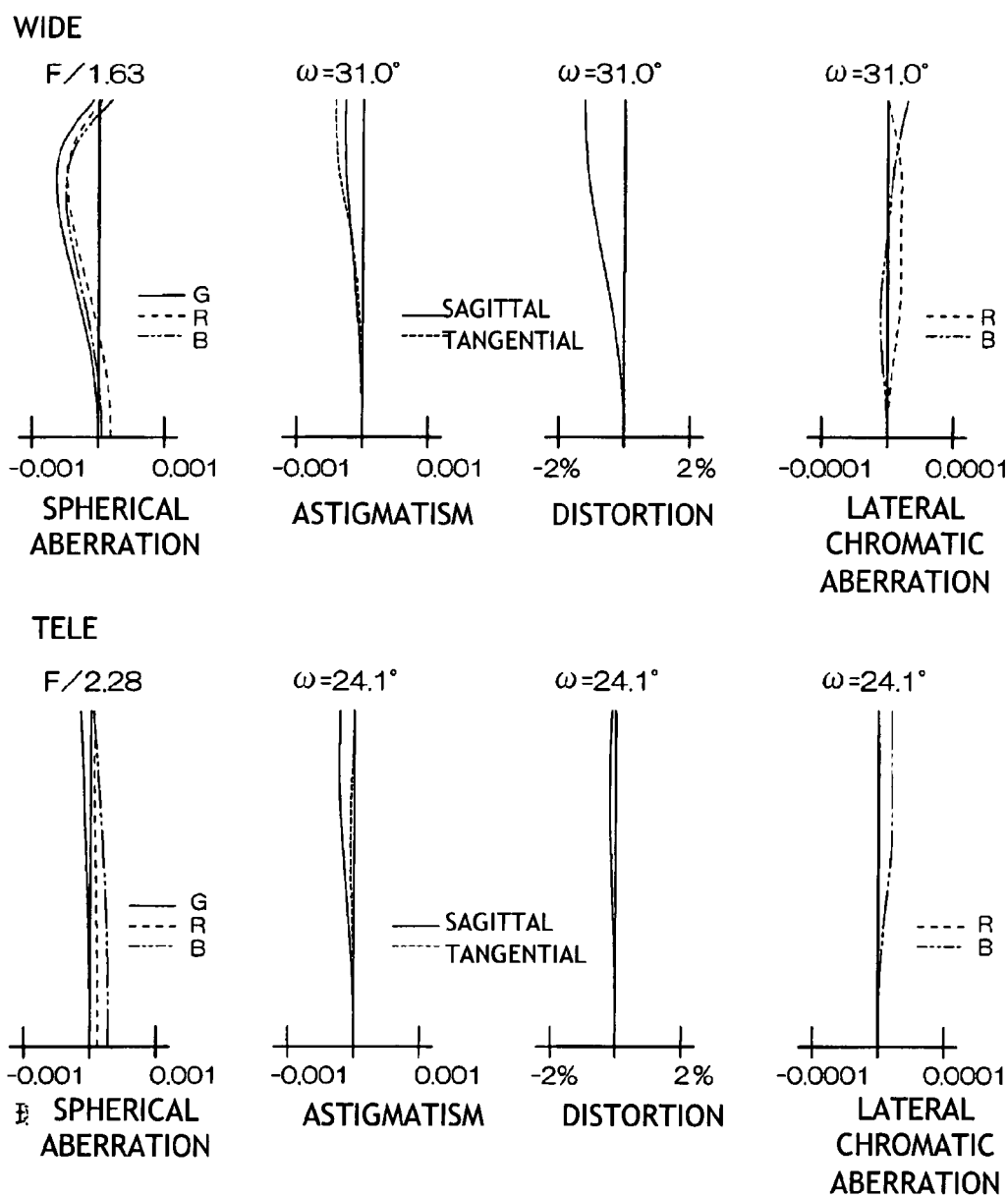
FIG. 8 is an aberration chart showing the lens configuration of the projection zoom lens according to Example 4.

Also, FIG. 8 is an aberration chart showing various aberrations (spherical aberration, astigmatism, distortion, and lateral color aberration) at the wide-angle end (wide) of the projection zoom lens according to Example 4 and at the telephoto end (tele) of the projection zoom lens according to Example 4.

As apparent from FIG. 8 and Tables 7 and 8, according to the projection zoom lens of Example 4, aberrations can be favorably corrected over the whole zoom range, an appropriate amount of back focus and a substantial telecentricity on the reduction side can be achieved, and individual performances, such as brightness, compactness, wideness of the viewing angle, and the zoom ratio, can be exhibited with the best balance. In particular, the brightness and lateral color aberrations can be made extremely favorable.

EXAMPLE 5

Figure 9:
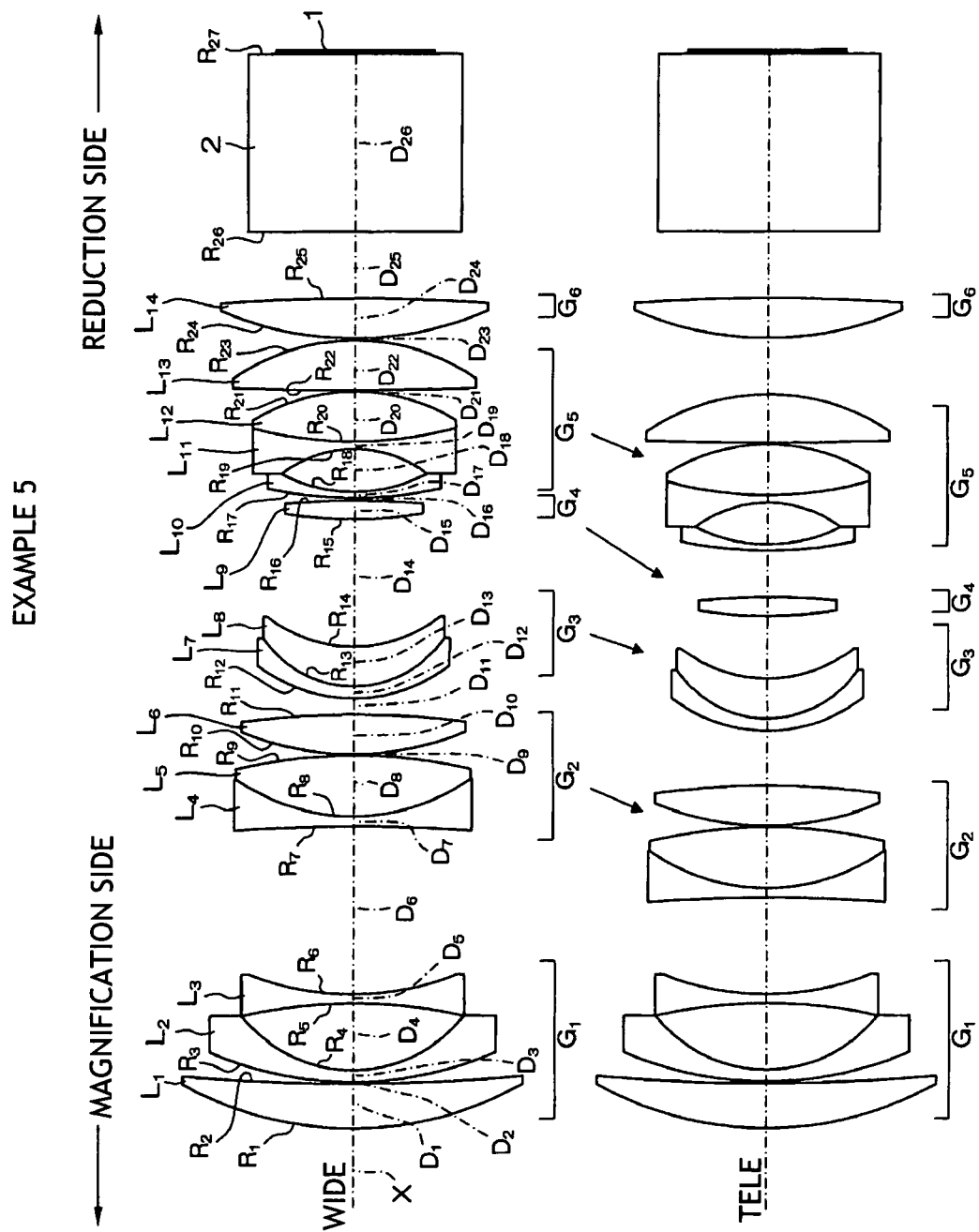
FIG. 9 is a view showing the lens configuration of a projection zoom lens according to Example 5 at its wide-angle end and at its telephoto end, respectively.

A projection zoom lens according to Example 5 has a lens configuration as shown in FIG. 9. This projection zoom lens basically has almost the same configuration as that of Example 1. However, this projection zoom lens is different from that of Example 1 in that the sixth lens group $G_6$ is constituted by a biconcave lens ($L_{14}$) including a surface, which has a strong curvature and directed to the magnification side.

Table 9 shows the radius of curvature R of each lens surface, the center thickness of each lens, the air gap D between adjacent lenses, and the refractive index N and Abbe number ν of each lens with respect to d-line in Example 5.

Also, the upper part of Table 9 shows the focal length f, F number, and viewing angle 2ω of the whole system in Example 5.

Moreover, the lower part of Table 9 shows the distance $D_6$ (variable 1) between the first lens group $G_1$ and the second lens group $G_2$, the distance $D_{11}$ (variable 2) between the second lens group $G_2$ and the third lens group $G_3$, the distance $D_{14}$ (variable 3) between the third lens group $G_3$ and the fourth lens group $G_4$, the distance $D_{16}$ (variable 4) between the fourth lens group $G_4$ and the fifth lens group $G_5$, and the distance $D_{23}$ (variable 5) between the fifth lens group $G_5$ and the sixth lens group $G_6$, at each of the wide-angle end (zoom ratio: 1.00) and the telephoto end (zoom ratio: 1.33).

TABLE 9

Focal Length f = 1.00~1.33
Fno. = 1.63~2.11
Angle of View 2ω = 55.0~42.4 degrees

| Surface Number | R | D | $N_d$ | $v_d$ |
|---|---|---|---|---|
| 1 | 2.169 | 0.268 | 1.71300 | 53.9 |
| 2 | 11.849 | 0.010 | | |
| 3 | 2.256 | 0.069 | 1.61800 | 63.4 |
| 4 | 0.883 | 0.398 | | |
| 5 | −3.086 | 0.054 | 1.69680 | 55.5 |
| 6 | 1.715 | Variable 1 | | |
| 7 | −10.242 | 0.058 | 1.84666 | 23.8 |
| 8 | 1.275 | 0.364 | 1.68893 | 31.1 |
| 9 | −3.122 | 0.007 | | |
| 10 | 1.825 | 0.238 | 1.77250 | 49.6 |
| 11 | −5.172 | Variable 2 | | |
| 12 | 0.969 | 0.073 | 1.83481 | 42.7 |
| 13 | 0.674 | 0.239 | 1.62004 | 36.3 |
| 14 | 0.869 | Variable 3 | | |
| 15 | 2.701 | 0.111 | 1.77250 | 49.6 |
| 16 | −5.311 | Variable 4 | | |
| 17 | 2.574 | 0.037 | 1.48749 | 70.4 |
| 18 | 0.988 | 0.252 | | |
| 19 | −0.745 | 0.046 | 1.78472 | 25.7 |
| 20 | 2.449 | 0.301 | 1.49700 | 81.6 |
| 21 | −1.198 | 0.010 | | |
| 22 | 23.665 | 0.293 | 1.61800 | 63.4 |
| 23 | −1.350 | Variable 5 | | |
| 24 | 2.106 | 0.237 | 1.83481 | 42.7 |
| 25 | −11.936 | 0.395 | | |
| 26 | ∞ | 1.058 | 1.51633 | 64.1 |
| 27 | ∞ | | | |

| | Variable 1 | Variable 2 | Variable 3 | Variable 4 | Variable 5 |
|---|---|---|---|---|---|
| Zoom Ratio 1.00 | 1.006 | 0.095 | 0.758 | 0.017 | 0.012 |
| Zoom Ratio 1.33 | 0.576 | 0.328 | 0.373 | 0.277 | 0.332 |

Also, Table 10 shows back focus BF and numerical values corresponding to the individual conditional expressions (1) to (3) in Example 5.

TABLE 10

| |F3|/F | 12.886 |
|---|---|
| F4/F | 2.332 |
| |F5|/F | 4.995 |
| BF | 1.093 |

Figure 10:
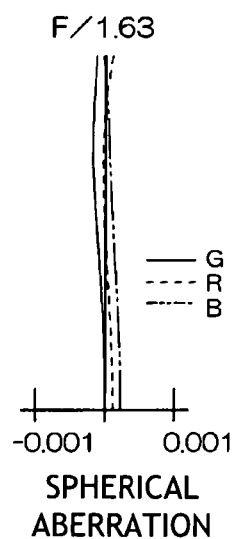
FIG. 10 is an aberration chart showing the lens configuration of the projection zoom lens according to Example 5.
Figure 10:
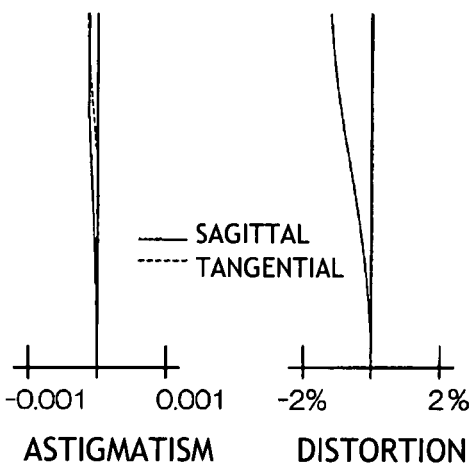
Figure 10:
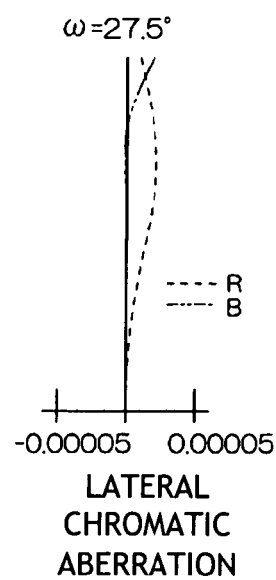
Figure 10:
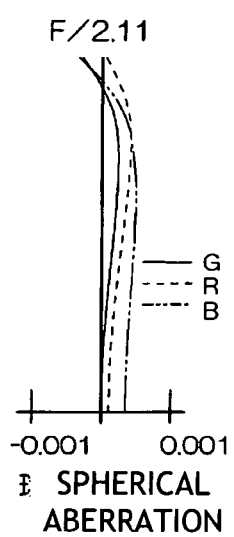
Figure 10:
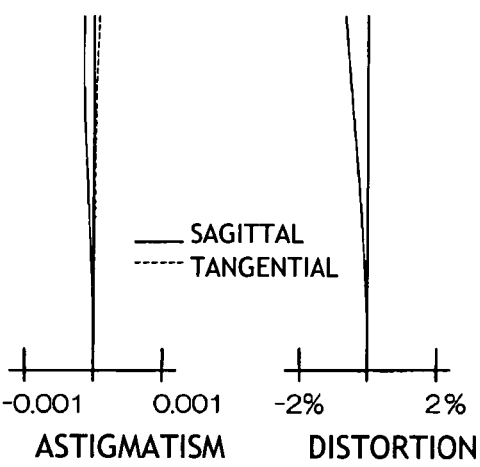
Figure 10:
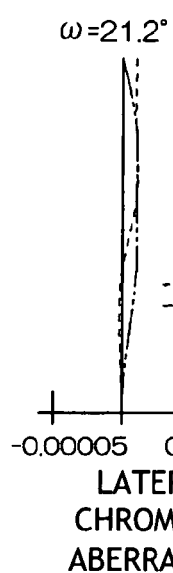

Also, FIG. 10 is an aberration chart showing various aberrations (spherical aberration, astigmatism, distortion, and lateral color aberration) at the wide-angle end (wide) of the projection zoom lens according to Example 5 and at the telephoto end (tele) of the projection zoom lens according to Example 5.

As apparent from FIG. 10 and Tables 9 and 10, according to the projection zoom lens of Example 5, aberrations can be favorably corrected over the whole zoom range, an appropriate amount of back focus and a substantial telecentricity on the reduction side can be achieved, and individual performances, such as brightness, compactness, wideness of the viewing angle, and the zoom ratio, can be exhibited with the best balance. In particular, the brightness and lateral color aberrations can be made extremely favorable.

EXAMPLE 6

Figure 11:
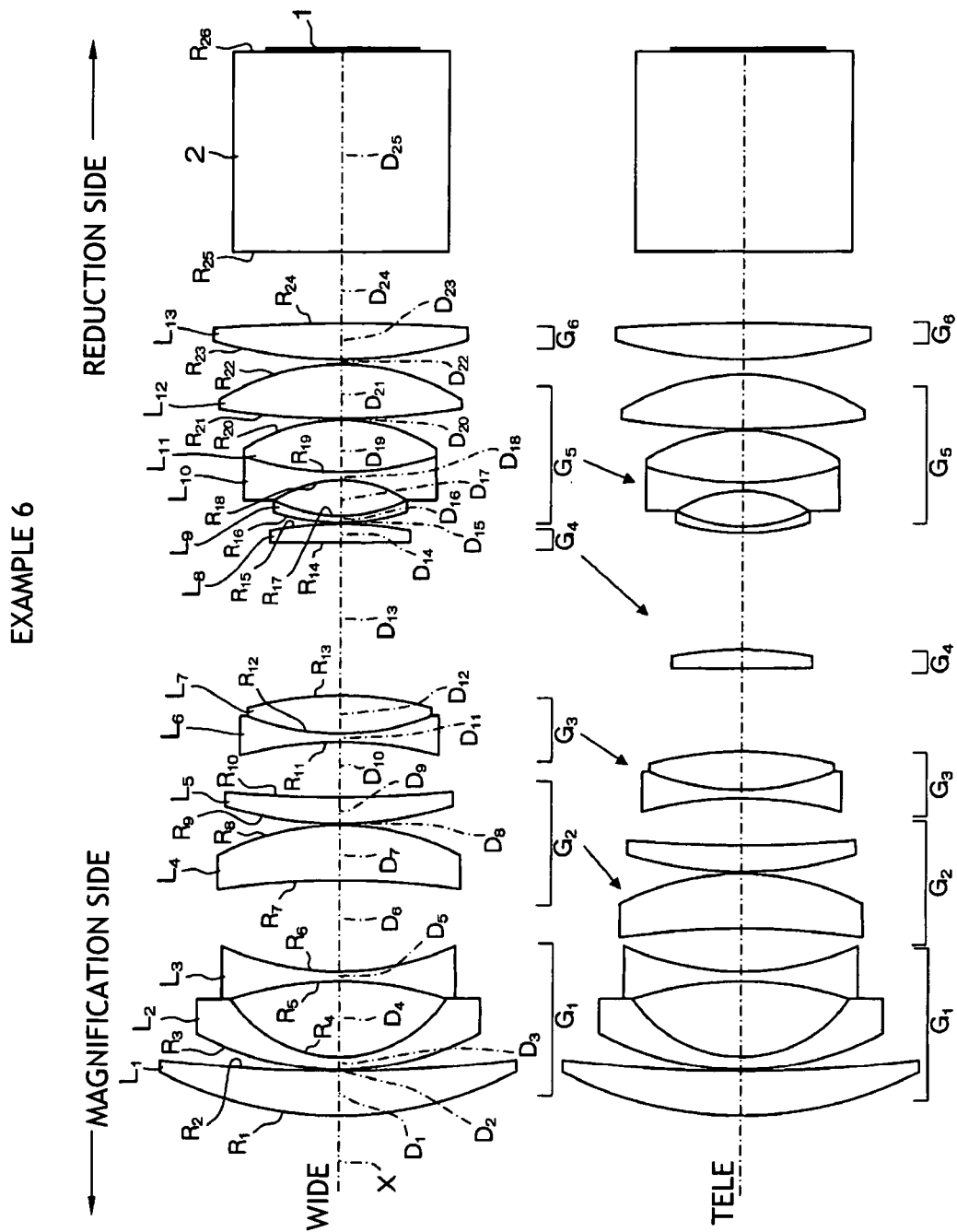
FIG. 11 is a view showing the lens configuration of a projection zoom lens according to Example 6 at its wide-angle end and at its telephoto end, respectively.

A projection zoom lens according to Example 6 has a lens configuration as shown in FIG. 11. This projection zoom lens is different from that of Example 2 in that the second lens group $G_2$ is constituted by a positive meniscus lens ($L_4$) having a convex surface directed to the reduction side and a positive meniscus lens ($L_5$) having a convex surface directed to the magnification side, and that the third lens group $G_3$ is constituted by a cemented lens formed by cementing a biconcave lens ($L_6$) and a biconvex lens ($L_7$).

Table 11 shows the radius of curvature R of each lens surface, the center thickness of each lens, the air gap D between adjacent lenses, and the refractive index N and Abbe number ν of each lens with respect to d-line in Example 6.

Also, the upper part of Table 11 shows the focal length f, F number, and viewing angle 2ω of the whole system in Example 6.

Moreover, the lower part of Table 11 shows the distance $D_6$ (variable 1) between the first lens group $G_1$ and the second lens group $G_2$, the distance $D_{10}$ (variable 2) between the second lens group $G_2$ and the third lens group $G_3$, the distance $D_{13}$ (variable 3) between the third lens group $G_3$ and the fourth lens group $G_4$, the distance $D_{15}$ (variable 4) between the fourth lens group $G_4$ and the fifth lens group $G_5$, and the distance $D_{22}$ (variable 5) between the fifth lens group $G_5$ and the sixth lens group $G_6$, at each of the wide-angle end (zoom ratio: 1.00) and the telephoto end (zoom ratio: 1.33).

TABLE 11

Focal Length f = 1.00~1.33
Fno. = 1.63~2.30
Angle of view 2ω = 62.0~48.0 degrees

| Surface Number | R | D | $N_d$ | $v_d$ |
|---|---|---|---|---|
| 1 | 2.703 | 0.310 | 1.78590 | 44.2 |
| 2 | 10.494 | 0.010 | 1.00000 | |
| 3 | 2.088 | 0.086 | 1.71300 | 53.9 |
| 4 | 0.916 | 0.519 | 1.00000 | |
| 5 | −2.439 | 0.066 | 1.80518 | 25.4 |
| 6 | 1.991 | Variable 1 | 1.00000 | |
| 7 | −6.118 | 0.374 | 1.83400 | 37.2 |
| 8 | −1.874 | 0.012 | 1.00000 | |
| 9 | 2.740 | 0.179 | 1.84666 | 23.8 |
| 10 | 8.981 | Variable 2 | 1.00000 | |
| 11 | −2.745 | 0.059 | 1.56883 | 56.3 |
| 12 | 1.756 | 0.262 | 1.69680 | 55.5 |
| 13 | −2.510 | Variable 3 | 1.00000 | |
| 14 | 46.375 | 0.131 | 1.62041 | 60.3 |
| 15 | −2.641 | Variable 4 | 1.00000 | |
| 16 | 1.574 | 0.046 | 1.62004 | 36.3 |
| 17 | 1.076 | 0.240 | 1.00000 | |
| 18 | −0.867 | 0.056 | 1.84666 | 23.8 |
| 19 | 2.160 | 0.351 | 1.62041 | 60.3 |
| 20 | −1.280 | 0.010 | 1.00000 | |
| 21 | 5.385 | 0.374 | 1.58913 | 61.2 |
| 22 | −1.605 | Variable 5 | 1.00000 | |
| 23 | 3.141 | 0.245 | 1.80518 | 25.4 |
| 24 | −12.409 | 0.490 | 1.00000 | |
| 25 | ∞ | 1.357 | 1.51633 | 64.1 |
| 26 | ∞ | | | |

| | Variable 1 | Variable 2 | Variable 3 | Variable 4 | Variable 5 |
|---|---|---|---|---|---|
| Zoom Ratio 1.00 | 0.623 | 0.377 | 1.047 | 0.009 | 0.033 |
| Zoom Ratio 1.33 | 0.291 | 0.319 | 0.568 | 0.802 | 0.107 |

Also, Table 12 shows back focus BF and numerical values corresponding to the individual conditional expressions (1) to (3) in Example 6.

TABLE 12

| | |
|---|---|
| |F3|/F | 6.587 |
| F4/F | 4.031 |
| |F5|/F | 21.534 |
| BF | 1.385 |

Figure 12:
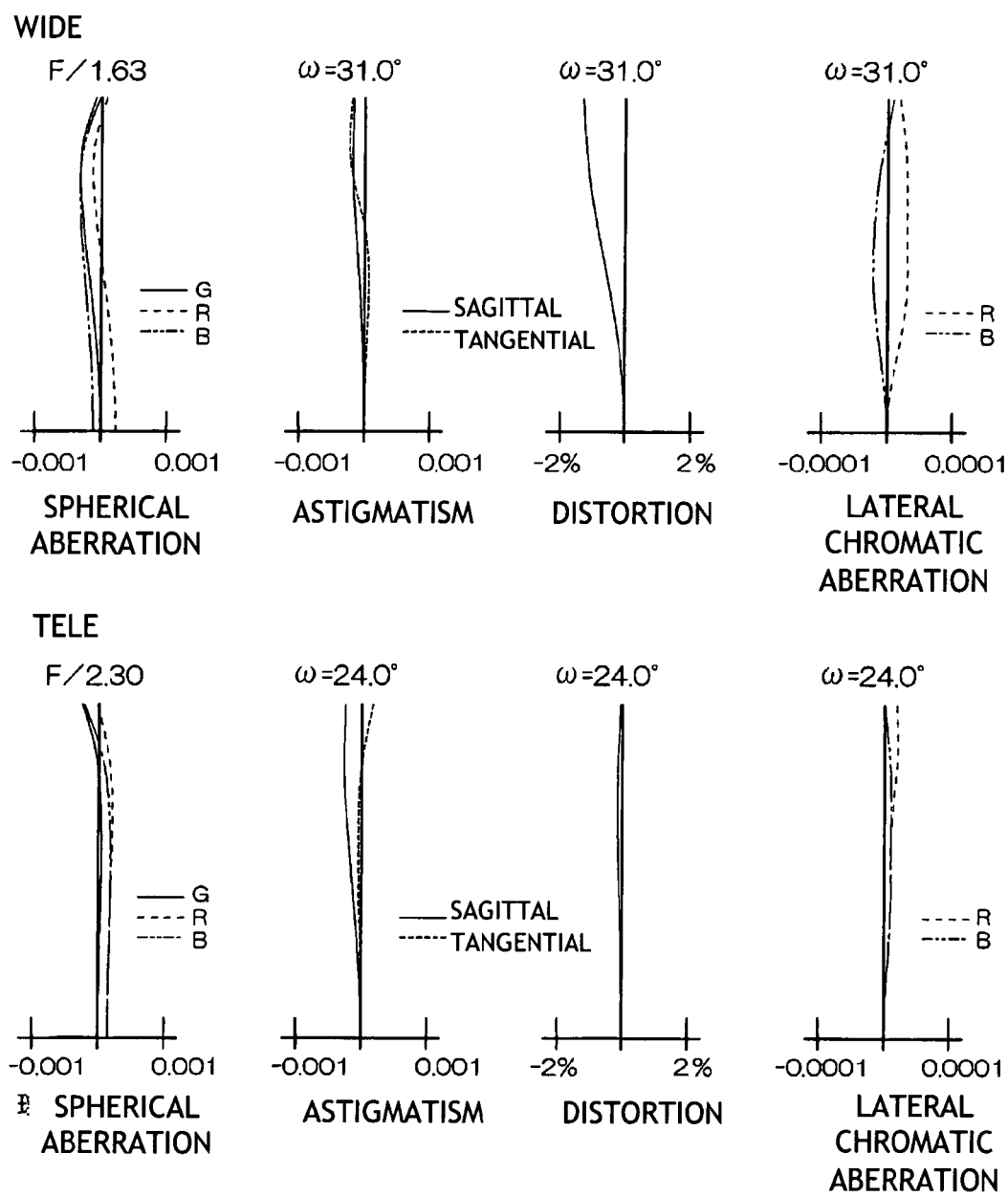
FIG. 12 is an aberration chart showing the lens configuration of the projection zoom lens according to Example 6.

Also, FIG. 12 is an aberration chart showing various aberrations (spherical aberration, astigmatism, distortion, and lateral color aberration) at the wide-angle end (wide) of the projection zoom lens according to Example 6 and at the telephoto end (tele) of the projection zoom lens according to Example 6.

As apparent from FIG. 12 and Tables 11 and 12, according to the projection zoom lens of Example 6, aberrations can be favorably corrected over the whole zoom range, an appropriate amount of back focus and a substantial telecentricity on the reduction side can be achieved, and individual performances, such as brightness, compactness, wideness of the viewing angle, and the zoom ratio, can be exhibited with the best balance. In particular, the brightness and lateral color aberrations can be made extremely favorable.

EXAMPLE 7

Figure 13:
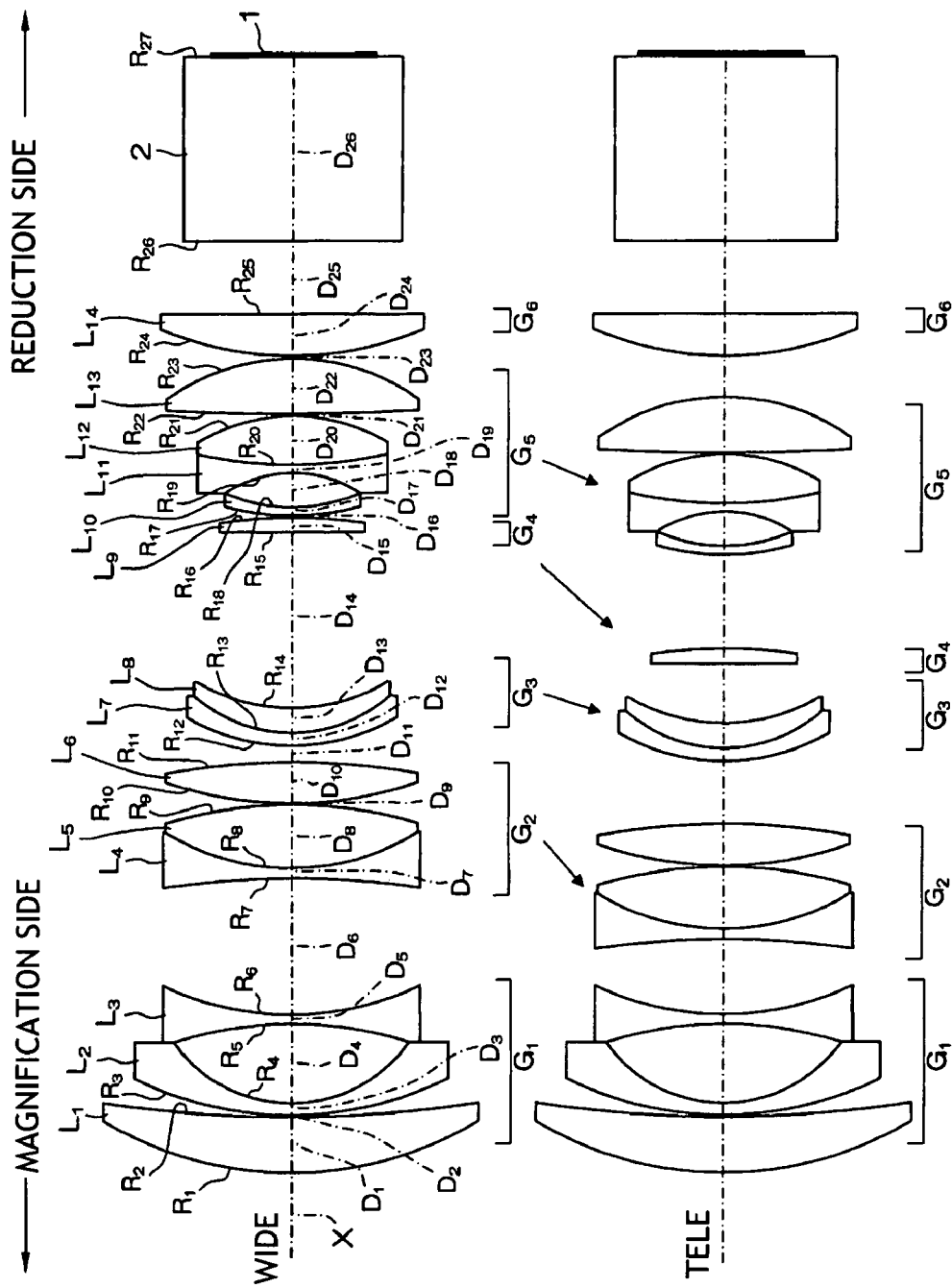
FIG. 13 is a view showing the lens configuration of a projection zoom lens according to Example 7 at its wide-angle end and at its telephoto end, respectively.

A projection zoom lens according to Example 7 has a lens configuration as shown in FIG. 13. This projection zoom lens basically has almost the same configuration as that of Example 1.

Table 13 shows the radius of curvature R of each lens surface, the center thickness of each lens, the air gap D between adjacent lenses, and the refractive index N and Abbe number ν of each lens with respect to d-line in Example 7.

Also, the upper part of Table 13 shows the focal length f, F number, and viewing angle 2ω of the whole system in Example 7.

Moreover, the lower part of Table 13 shows the distance $D_6$ (variable 1) between the first lens group $G_1$ and the second lens group $G_2$, the distance $D_{11}$ (variable 2) between the second lens group $G_2$ and the third lens group $G_3$, the distance $D_{14}$ (variable 3) between the third lens group $G_3$ and the fourth lens group $G_4$, the distance $D_{16}$ (variable 4) between the fourth lens group $G_4$ and the fifth lens group $G_5$, and the distance $D_{23}$ (variable 5) between the fifth lens group $G_5$ and the sixth lens group $G_6$, at each of the wide-angle end (zoom ratio: 1.00) and the telephoto end (zoom ratio: 1.30).

TABLE 13

Focal Length f = 1.00~1.30
Fno. = 1.52~2.11
Angle of View 2ω = 54.6~43.0 degrees

| Surface Number | R | D | $N_d$ | $v_d$ |
|---|---|---|---|---|
| 1 | 2.140 | 0.327 | 1.77250 | 49.6 |
| 2 | 7.509 | 0.010 | | |
| 3 | 2.097 | 0.069 | 1.69680 | 55.5 |
| 4 | 0.863 | 0.452 | | |
| 5 | −2.262 | 0.053 | 1.62041 | 60.3 |
| 6 | 1.784 | Variable 1 | | |
| 7 | −5.232 | 0.057 | 1.84666 | 23.8 |
| 8 | 1.423 | 0.361 | 1.74950 | 35.3 |
| 9 | −2.680 | 0.007 | | |
| 10 | 2.273 | 0.238 | 1.83481 | 42.7 |
| 11 | −4.178 | Variable 2 | | |
| 12 | 1.257 | 0.072 | 1.69680 | 55.5 |
| 13 | 0.878 | 0.143 | 1.68893 | 31.1 |
| 14 | 1.112 | Variable 3 | | |
| 15 | 55.924 | 0.086 | 1.69680 | 55.5 |
| 16 | −2.995 | Variable 4 | | |
| 17 | 1.493 | 0.049 | 1.51742 | 52.4 |
| 18 | 1.021 | 0.195 | | |
| 19 | −0.745 | 0.046 | 1.80518 | 25.4 |
| 20 | 2.525 | 0.283 | 1.43875 | 95.0 |
| 21 | −1.089 | 0.010 | | |
| 22 | 12.856 | 0.320 | 1.69680 | 55.5 |
| 23 | −1.290 | Variable 5 | | |
| 24 | 1.995 | 0.238 | 1.83400 | 37.2 |
| 25 | ∞ | 0.420 | | |
| 26 | ∞ | 1.051 | 1.51633 | 64.1 |
| 27 | ∞ | | | |

TABLE 13-continued

Focal Length f = 1.00~1.30
Fno. = 1.52~2.11
Angle of View 2ω = 54.6~43.0 degrees

|  | Variable 1 | Variable 2 | Variable 3 | Variable 4 | Variable 5 |
|---|---|---|---|---|---|
| Zoom Ratio 1.00 | 0.786 | 0.094 | 1.005 | 0.010 | 0.015 |
| Zoom Ratio 1.30 | 0.432 | 0.357 | 0.343 | 0.541 | 0.236 |

Also, Table 14 shows back focus BF and numerical values corresponding to the individual conditional expressions (1) to (3) in Example 7.

TABLE 14

| |F3|/F | 32.240 |
|---|---|
| F4/F | 4.082 |
| |F5|/F | 371.316 |
| BF | 1.112 |

Figure 14:
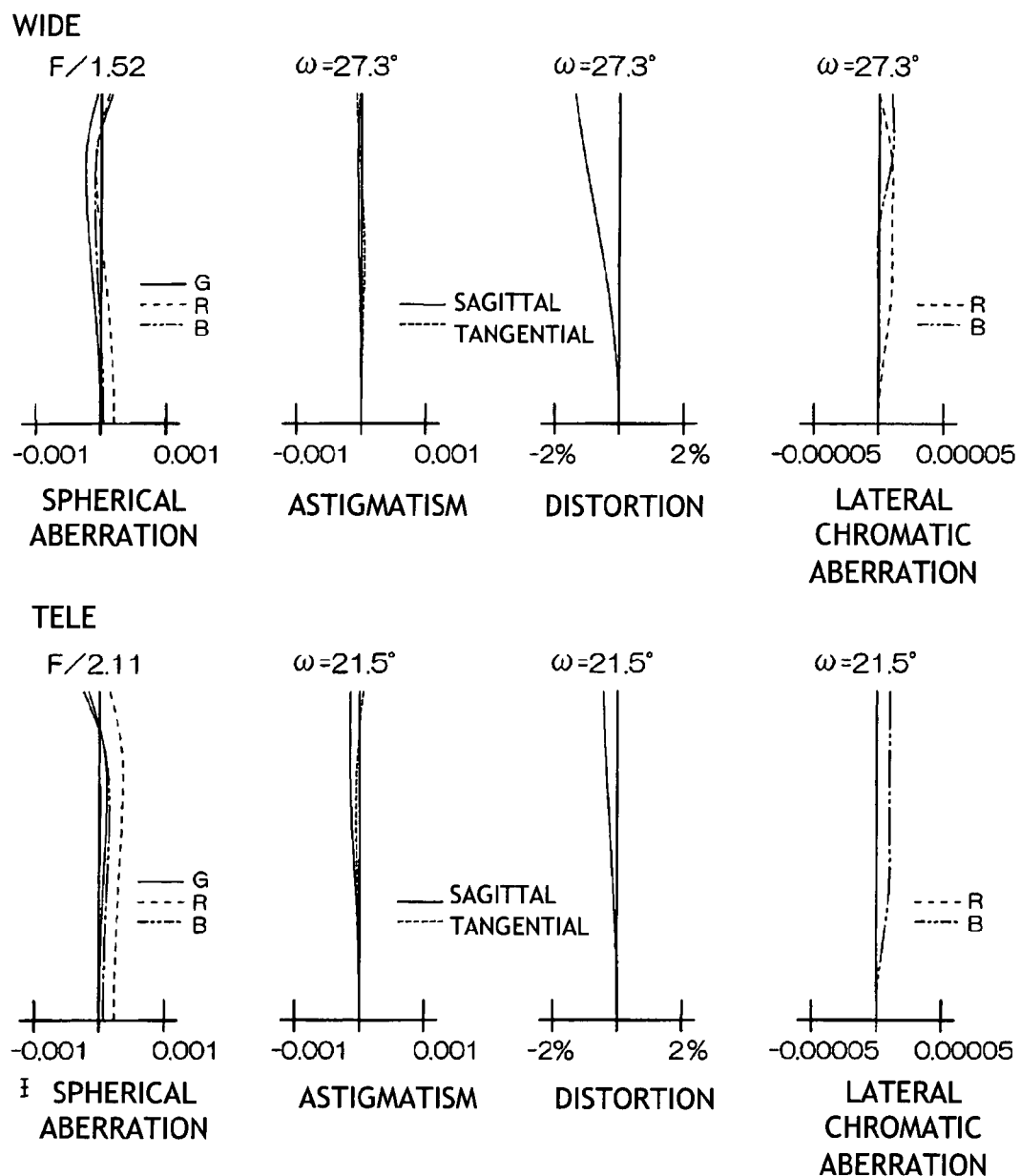
FIG. 14 is an aberration chart showing the lens configuration of the projection zoom lens according to Example 7.

Also, FIG. 14 is an aberration chart showing various aberrations (spherical aberration, astigmatism, distortion, and lateral color aberration) at the wide-angle end (wide) and telephoto end (tele) of the projection zoom lens according to Example 7.

As apparent from FIG. 14 and Tables 13 and 14, according to the projection zoom lens of Example 7, aberrations can be favorably corrected over the whole zoom range, an appropriate amount of back focus and a substantial telecentricity on the reduction side can be achieved, and individual performances, such as brightness, compactness, wideness of the viewing angle, and the zoom ratio, can be exhibited with the best balance. In particular, the brightness and lateral color aberrations can be made extremely favorable.

What is claimed is:

1. A projection zoom lens comprising, in order from a magnification side:
    a first lens group that performs focusing with being fixed when a power of the projection zoom lens varies, the first lens group having a negative refractive power;
    a second lens group having a positive refractive power;
    a third lens group having a positive or negative refractive power;
    a fourth lens group having a positive refractive power;
    a fifth lens group having a positive or negative refractive power; and
    a sixth lens group that is fixed when the power of the projection zoom lens varies, the sixth lens group having a positive refractive power, wherein:
    the second to fifth lens groups move with a mutual relationship to compensate continuously varying of the power of the projection zoom lens and movement of an image plane caused by the continuously varying of the power of the projection zoom lens,
    the fifth lens group comprises
        a cemented lens formed by cementing a negative meniscus lens having a convex surface directed to the magnification side, a negative lens and a positive lens in order from the magnification side, and
        a positive lens having a convex surface directed to a reduction side, and
    a telephoto end position of each of the second lens group, the fourth lens group and the fifth lens group is closer to the magnification side than a wide-angle end position of each of the second lens group, the fourth lens group and the fifth lens group.

2. The projection zoom lens according to claim 1, wherein: the following conditional expression (1) is satisfied:

$$|F5|/F > 4.5 \quad (1)$$

where
    F denotes a focal length of the projection zoom lens at a wide-angle end with a position of a conjugate point on the magnification side being at infinity, and
    F5 denotes a focal length of the fifth lens group.

3. The projection zoom lens according to claim 1, wherein: the following conditional expression (2) is satisfied:

$$|F3|/F > 4.5 \quad (2)$$

where
    F denotes a focal length of the projection zoom lens at a wide-angle end with a position of a conjugate point on the magnification side being at infinity, and
    F3 denotes a focal length of the third lens group.

4. The projection zoom lens according to claim 1, wherein: the following conditional expression (3) is satisfied:

$$2.0 < F4/F < 4.5 \quad (3)$$

where
    F denotes a focal length of the projection zoom lens at a wide-angle end with a position of a conjugate point on the magnification side being at infinity, and
    F4 denotes a focal length of the fourth lens group.

5. The projection zoom lens according to claim 1, wherein the fourth lens group comprises one positive lens.

6. The projection zoom lens according to claim 1, wherein the second lens group comprises at least two positive single lenses.

7. The projection zoom lens according to claim 1, wherein the second lens group comprises:
    a cemented lens formed by cementing a negative lens and a positive lens; and
    another positive lens.

8. A projection display device comprising:
    a light source;
    a light valve; and
    the projection zoom lens according to claim 1 as a projection lens that projects onto a screen an optical image formed of light modulated by the light valve.

* * * * *